(12) United States Patent
Kanevsky

(10) Patent No.: US 6,300,947 B1
(45) Date of Patent: Oct. 9, 2001

(54) DISPLAY SCREEN AND WINDOW SIZE RELATED WEB PAGE ADAPTATION SYSTEM

(75) Inventor: Dimitri Kanevsky, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/110,499

(22) Filed: Jul. 6, 1998

(51) Int. Cl.[7] .................................................... G06F 3/00
(52) U.S. Cl. .......................... 345/333; 345/346; 707/513
(58) Field of Search ................................... 345/333–335, 345/342, 346, 356; 707/501, 523, 513

(56) References Cited

U.S. PATENT DOCUMENTS

| | | | |
|---|---|---|---|
| 5,726,688 | * 3/1998 | Siefert et al. | 345/352 |
| 5,727,174 | * 3/1998 | Aparicio, IV et al. | 345/348 |
| 5,765,176 | * 6/1998 | Bloomberg | 707/514 |
| 5,835,712 | * 2/2000 | DuFresne | 709/203 |
| 5,983,227 | * 11/1999 | Nazem et al. | 707/10 |
| 6,023,714 | * 2/2000 | Hill et al. | 707/513 |
| 6,100,888 | * 8/2000 | Gourdol et al. | 345/348 |

FOREIGN PATENT DOCUMENTS 9717662   5/1997   (WO) .

* cited by examiner

*Primary Examiner*—Raymond J. Bayerl
*Assistant Examiner*—Sy D. Luu
(74) *Attorney, Agent, or Firm*—F. Chau & Associates, LLP

(57) ABSTRACT

A web page adaptation system and method provides organization of viewing material associated with web sites for visual displays and windows on which these home pages are being viewed. A different viewing-access strategy is provided for such visual devices varying, for example, from standard PC monitors, laptop screens and palmtops to web phone and digital camera displays and from large windows to small windows. A new web site design incorporates features that permit automatic display of the content of home pages in the most friendly manner for a user viewing this content from a screen or window of a certain size. For example, if a size of a display screen or window allows, links are displayed with some text or pictures to which they are linked. Conversely, if a size of a screen or window does not allow display of all textual and icon information on a whole screen or window, the home page is mapped into hierarchically linked new smaller pages that fully fit the current display or window. The unique display strategy of the invention is provided by a web page adaptation scheme that is implemented on a web site server or is incorporated in a web browser (e.g., as a java applet) or both. This adaptation strategy employs variables that provide size of screen and/or window information from which a call to a web site was initiated.

28 Claims, 16 Drawing Sheets

| MODE | ICON SIZE | SCREEN 1 SIZE | WINDOW SIZE | SCREEN 2 SIZE | CHARACTER SIZE | COOKIES |
|---|---|---|---|---|---|---|
| 100 | 5 X 5 | 1056 X 350 | 800 X 600 | 1056 X 350 | 8 X 8 | YES |

```
****************************************************************************
```
  YAHOO

News for Wednesday November 5, 1997

Louise Woodward Sentencing-Iraq-U.S. Conflict

Help
      Top Stories-Headlines-Summaries 8:37 am est
      Business-Headlines-Summaries-Financial-Quotes-Motley Fool 8:08 am est
      Technology-Headlines-Summaries-Wired News-ZD News Tue Nov 4 3:09 pm
      World-Headlines-Summaries-Asian News 8:14 am est
      Sports-Headlines-Summaries-Scoreboard-The Sporting News 4:34 am est
      Entertainment-Headlines-Summaries-E! Online 8:18 am est
      Politics-Headlines-Summaries 7:41 am est
      Health-Headlines-Summaries Tue Nov 4 6

```
****************************************************************************
```
            701

On webphone:
```
****************************************************************************
```
YAHOO NEWS   Top Stories  .  Business  .  Others.

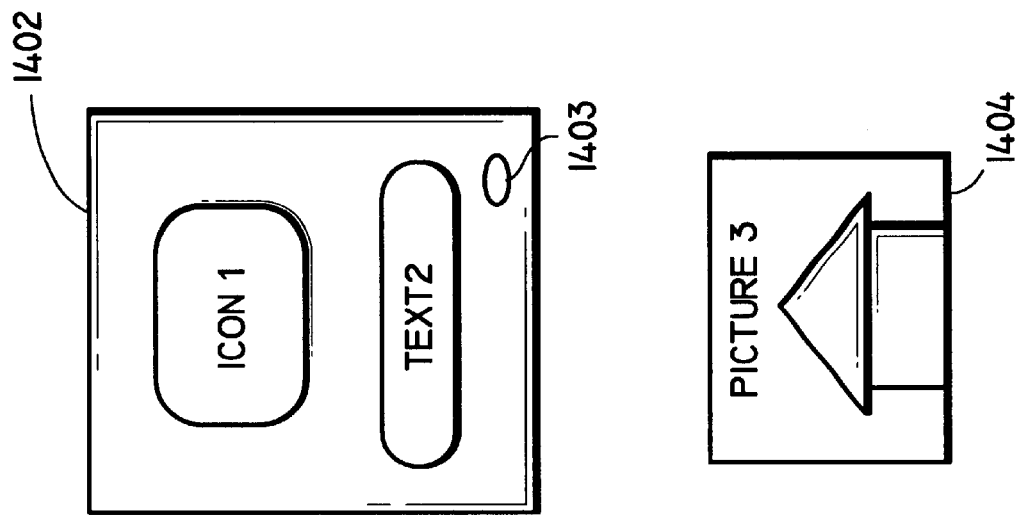
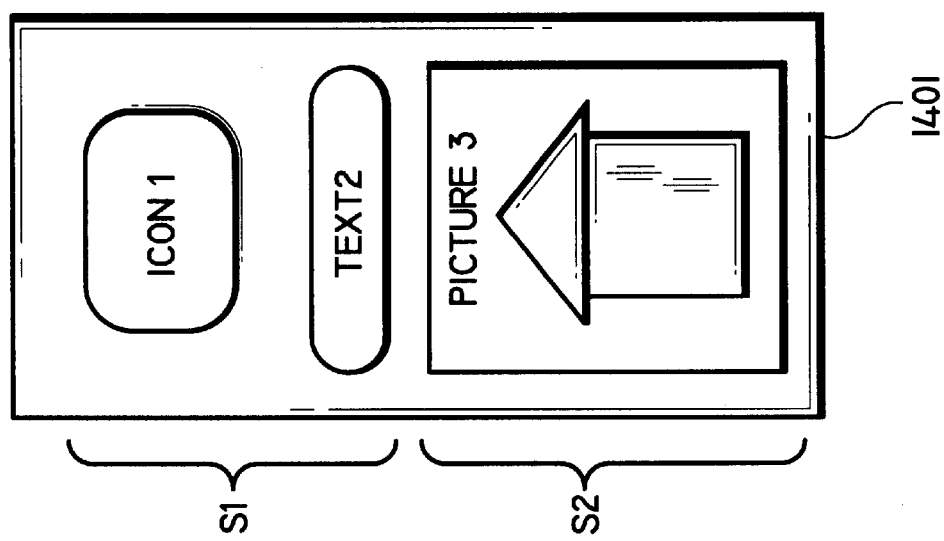
FIG. 12

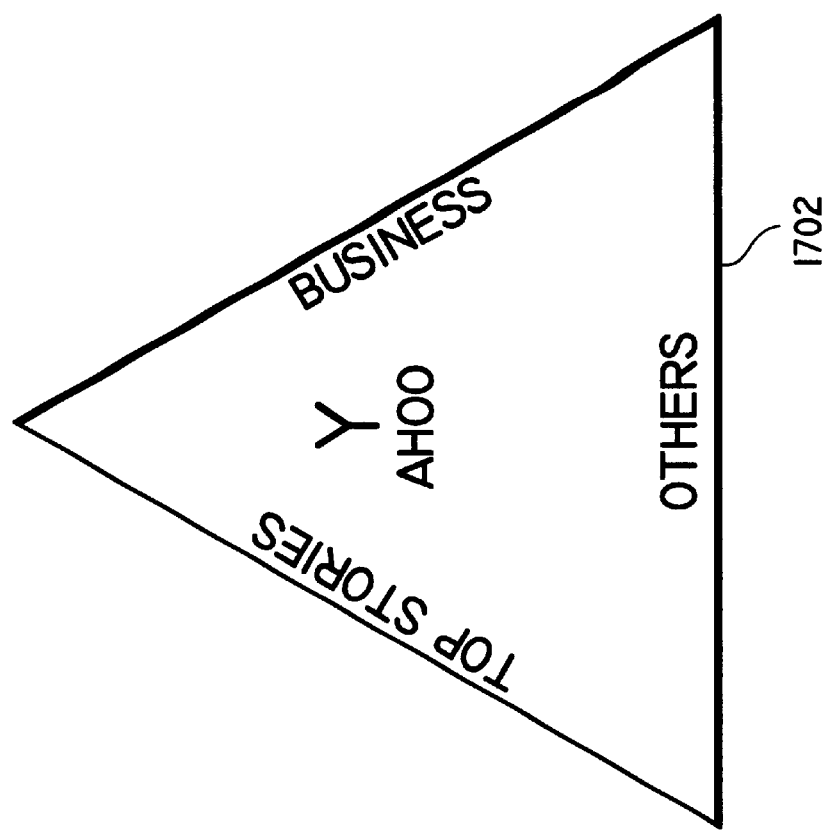
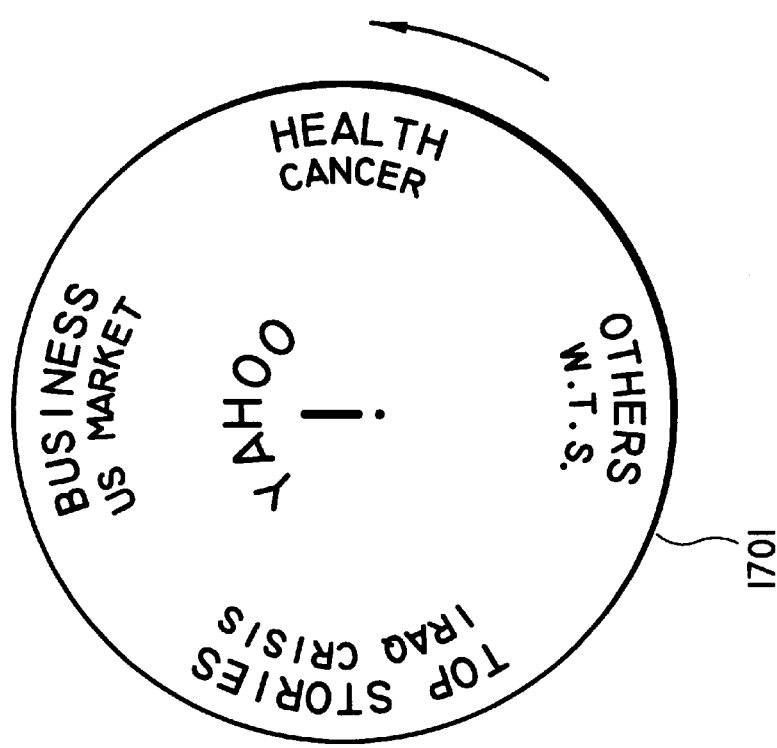
FIG. 15

DISPLAY SCREEN AND WINDOW SIZE RELATED WEB PAGE ADAPTATION SYSTEM

BACKGROUND OF THE INVENTION

The present invention relates to systems and methods for organizing viewing materials and, more particularly, to systems and methods for organizing viewing materials associated with web sites on visual display screens and windows on and within which the viewing materials, e.g., home or web pages, are being viewed.

Currently home or web pages, which are typically accessible over a wide area network (e.g., Internet), are designed without taking into account the variety of displays or windows on and within which they may be observed. Usually, only the most typical size of personal computer (PC) monitors are taken into account by web page designers. If such a web site is accessed from devices with small screens (e.g., palmtops, web phones), only small parts of the web pages can be viewed by users and, in order to access other parts of the web pages, users must move the respective home pages (left-right, down-up) across their displays. The only other options available to users of small screens is to convert the web site completely to a textual context. This is not an acceptable solution for most web site users. Conversely, if a user happens to have a relatively large display screen, the user can see a whole web page which may include several links. However, the user may need to activate several links, hierarchically, before he arrives at the link containing the needed information. The user of the larger display screen would be more satisfied if he could view the content of many links simultaneously, since the size of his display screen can accommodate such viewing. Similar problems occur if a user is viewing web pages in some window, or shell, whose size is only a fraction of a whole screen.

It is to be appreciated that the term "window" used herein is intended to refer to a graphical shell which is typically the outer layer of an applications program which provides the graphical user interface. Since the shell typically includes its own graphical symbols and format, the use of the shell results in only a fraction of the display screen being available to display web page data. Also, "window" may refer to the well-known graphical partitions employed by various software programs running under Microsoft Windows operating systems, which also result in only part of the display screen being available to display web page data.

A Netscape browser provides options for users to strip some specific bars and buttons from a menu, e.g., Jim Minatel, *Easy World Wide Web with Netscape*, Que Corporation, 1996. However, this frees only small amounts of a display screen or window and does not resolve the problem facing a user of not being able to display many objects associated with a web page.

SUMMARY OF THE INVENTION

The present invention provides organization of viewing material associated with web sites for visual displays and windows on and within which these web pages are being viewed. A different viewing-access strategy is provided for such visual devices varying, for example, from standard PC monitors, laptop screens and palmtops to webphone and digital camera displays, to any device, with a display, capable of web browsing, and from large windows to small windows. However, it is to be appreciated that the teachings of the present invention are not limited to implementation with the above-mentioned types of displays and one of ordinary skill in the art will contemplate usage with other forms of displays. A new web site design incorporates features that permit automatic display of the content of web pages in the most friendly manner for a user viewing this content from a screen or window of a certain size. For example, if a size of a display screen or window allows, links are displayed with some text or pictures to which they are linked. Conversely, if a size of a screen or window does not allow display of all textual and icon information on a whole screen or window, the web page is mapped into hierarchically linked new smaller pages that fully fit the current display or window. The unique display strategy of the invention is provided by a web page adaptation scheme that is implemented on a web site server, and also preferably partly incorporated on a client's computer such as in a web browser (e.g., as a java applet). This adaptation strategy employs variables that provide size of screen and/or window information associated with the visual display from which a call to a web site was initiated.

Advantageously, any type of display device and associated screen can be provided by a user: e.g., webphone or palmtop. Also, any size window may be displayed on such screen. The display adaptor of the present invention efficiently provides for special marks to be incorporated into scripts (e.g., URL) which describe format and link hierarchy. For example, let a first page (in some standard format) have icons I1, I2 I3, and I4 and links L1, L2, L3 and L4. Assume that icons I1 and I2 have a common topic that can be represented by the icon I12 and icons I3 and I4 have another common topic that can be represented by icon I34. Similarly, assume links L1, L2 and L3 are related to some topic that can be represented by a link L123. Then, according to the invention, if the web site is viewed on a display that is much smaller than a standard display, the viewer sees, e.g., icons I12 and I34 and links L123 and L4, i.e., four items instead of eight items. In order to access I1 or I2, the user must select icon I12 (e.g., by clicking on the icon using a conventional computer mouse) and the icons I1 and I2 are displayed. Similarly, the user can view other hierarchically ordered links. Conversely, if the user views the web site on a screen that is larger than a standard display screen, not only are icons I1, I2, I3, I4 and links L1, L2, L3, L4 displayed, but some other icons and links that are hierarchically related to those items are displayed.

The present invention also preferably provides a semantic interpreter module that automatically decides how to fold or expand the content of web pages depending on a size of a screen or window without using preliminary marks left by web designers. This semantic module can be formed as a Finite State Automata (FSA) system whose states and arcs correspond to different web page appearances (e.g., links, titles, sizes of words, semantic interpretation words in links and titles, relative position of main items on pages). It is to be understood that FSA is a concept associated with a finite system whose states correspond to some situations and whose arcs correspond to some transition rules. An FSA system is among the simplest computing machines. FSA is well known in the art with extensive literature associated therewith, e.g., Gerald Gazdar & Chris Mellish, "Natural Language Processing in POP-11," Addison-Wesley Publishing Co., New York 1989. As described therein, simple semantic notions may be represented in a formal language and instructions are provided on what should be done when certain semantic data is obtained. The most natural application for FSA are situations where, first, semantic notions should be associated with some input data and, second, rules should be produced on what actions should follow given semantic notions. As a consequence of this fact, an interpreter module, e.g. a semantic interpreter module can be represented as FSA. As an example, interpretation of a symbol "HR" may be considered as a decorative element. This interpretation could be done using FSA methodology in which states correspond to some words of URL script and to a size of a display that is available, etc. Rules (that are represented by arcs) would require actions, e.g. "underline" in some special way some words if HR was presented and there is enough space. But always underline words in some way if they represent links, since links are typically recognized as underlined words. More complex sequences of states and rules could be associated with interpreting of icons. Icons would be states, arcs would correspond to sequences of rules on extracting a content (other states) from pictures in icons or titles (other states) in icons if they are available, etc. It is also to be appreciated that other techniques may be used to form the semantic interpreter module. For example, formal methods associated with expert knowledge system methodology may be used.

Further, the present invention provides means for counting how often each link on a page is visited. Links can be ordered via these counts and, as a result, on small screens or windows, links with higher scores are displayed first. Still further, the present invention provides a statistical approach, as will be explained, to formatting web pages via decision trees with questions about web page appearance, i.e., semantic interpretation. This decision tree can be trained on a set of examples pertaining to how web pages were designed. Decision trees are a special way to represent questions, as will be explained. Nodes represent a set of questions that are asked at this node and links to other nodes depend on answers to those questions. The other nodes that are connected to the first node in the decision trees represent another set of questions and so on. For example, at the first node A of a web related decision tree one can ask: Is this an icon? This node leads to two different nodes. For YES answer, A is connected to B1 and for NO answer A is connected to B2. The node B1 may contain a question: Is there a title in this icon? A node B2 can contain questions that clarify how an object in question is represented (Is this a link?, Is this a picture?, etc.) In statistical trees questions (splits) are found statistically (as explained in the text). In a binary tree, each (parent) node is connected with two (son) nodes, each of which is a parent node for next two (son) nodes on lower level. Nodes in binary trees correspond splits of sets in two subsets (that are interpreted as questions). For example, a set can be pictures. A first subset consists of pictures that contain living objects (people, animals) and the second subset could consist of objects that do not represent living objects (e.g. houses, cars etc.). This split represents some question about picture content. Statistical methods for producing such splits are described herein.

In one aspect of the present invention, computer-based apparatus for automatically adapting a viewable information signal received from a wide area network server for display on a display screen associated with a user computer system comprises: means for transmitting a user request signal from the user computer system to the network server, the user request signal including information relating to at least one display screen-related attribute associated with the user's display screen and information specific to the user's request; means for generating the viewable information signal in response to the information specific to the user's request; and means for adapting the viewable information signal in response to the at least one display screen-related attribute to conform the information associated therewith to the user's display screen when viewed.

These and other objects, features and advantages of the present invention will become apparent from the following detailed description of illustrative embodiments thereof, which is to be read in connection with the accompanying drawings in which the same reference numerals are used throughout the various figures to designate same or similar components.

BRIEF DESCRIPTION OF THE DRAWINGS

FIG. 5 is a diagram illustrating an exemplary display mode message according to the invention;

FIG. 7 is a diagram illustrating an example of an original and folded web page according to the invention;

FIG. 12 is a diagram illustrating an example of data separation according to the invention;

FIG. 15 is a diagram illustrating an example of an application of the invention to a display or window of non-conventional shape.

DETAILED DESCRIPTION OF PREFERRED EMBODIMENTS

Figure 1:
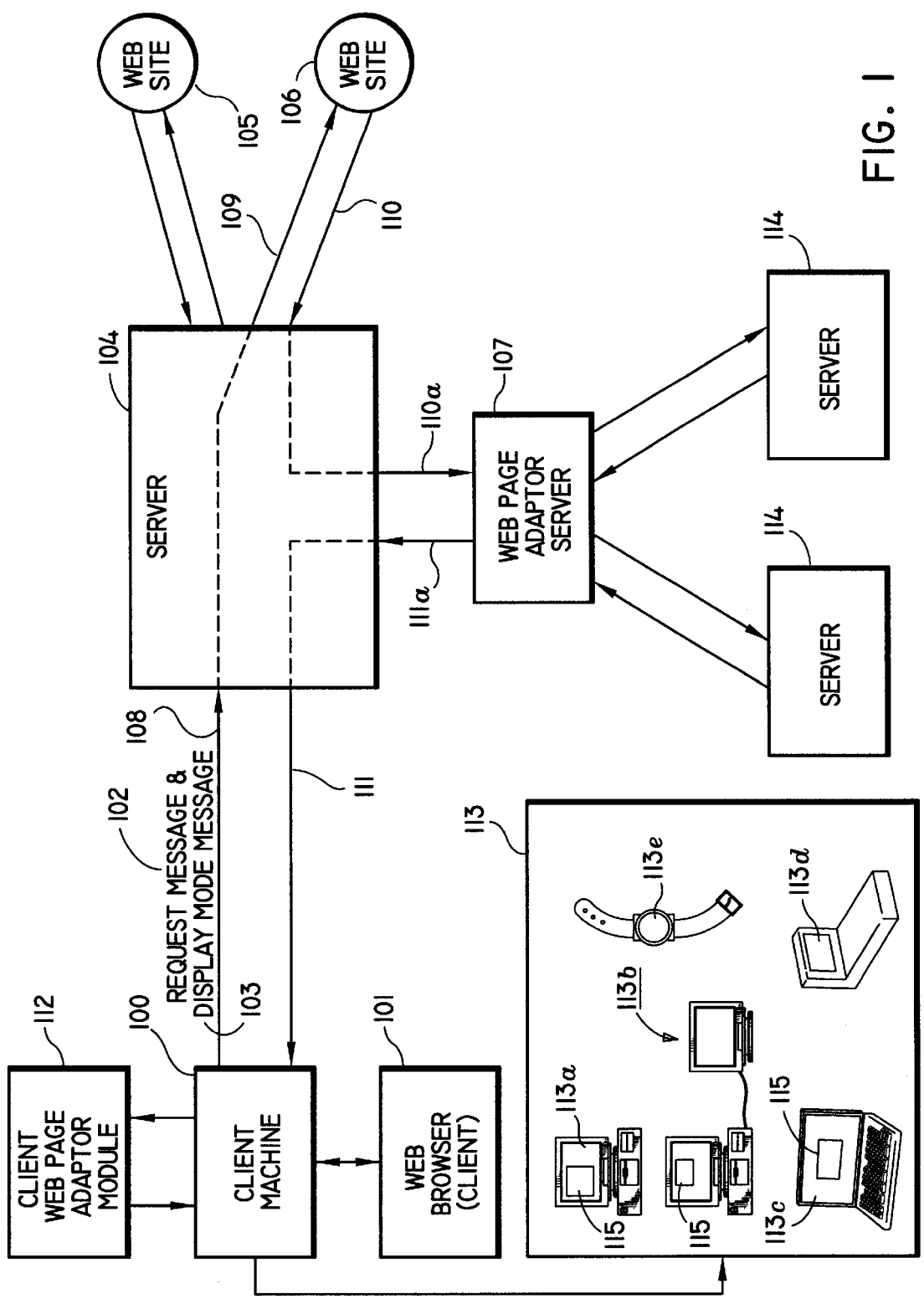
FIG. 1 is a diagram illustrating components of a display screen and window size related web page adaptation system according to the invention.

Referring initially to FIG. 1, a diagram illustrating components of a display screen and window size related web page adaptation system according to the invention is shown. The basic components of the display screen and window size related web page adaptation system are shown in relation to other components of the World Wide Web (WWW) in FIG. 1. While the invention is illustrated and described in the context of the WWW, the invention may be implemented on other similar networks and/or related networks that comprise the Internet (e.g., ftp). Block 100 represents a client machine (computer) that runs a web browser program 101 and a client web page adaptor module 112, as will be explained, and includes a display device 113. The client machine 100 is operatively coupled to a server 104. The server 104 is operatively coupled to web sites 105, 106 and a web page adaptor server 107. The web page adaptor server 107 is operatively coupled to servers 114.

It is to be appreciated that the client machine 100 may take many forms given the various existing types of devices having displays capable of viewing web site related data, e.g., personal computer (PC), multiscreen PC, laptop computer, webphone. However, the present invention is not limited to only these machines and may be implemented with other diverse client machines adapted to have communication and browsing ability, e.g., palmtops, calculator, web TV, remote control devices, clocks, digital cameras, vehicle-based computers, industrial facility-based computers. Of course, the above list is not exhaustive. Also, each display type may also be capable of displaying various sized windows (shells). Examples of such windows are shown on some of the display types (113*a*–113*e*), and denoted as windows 115, in FIG. 1.

Figure 2:
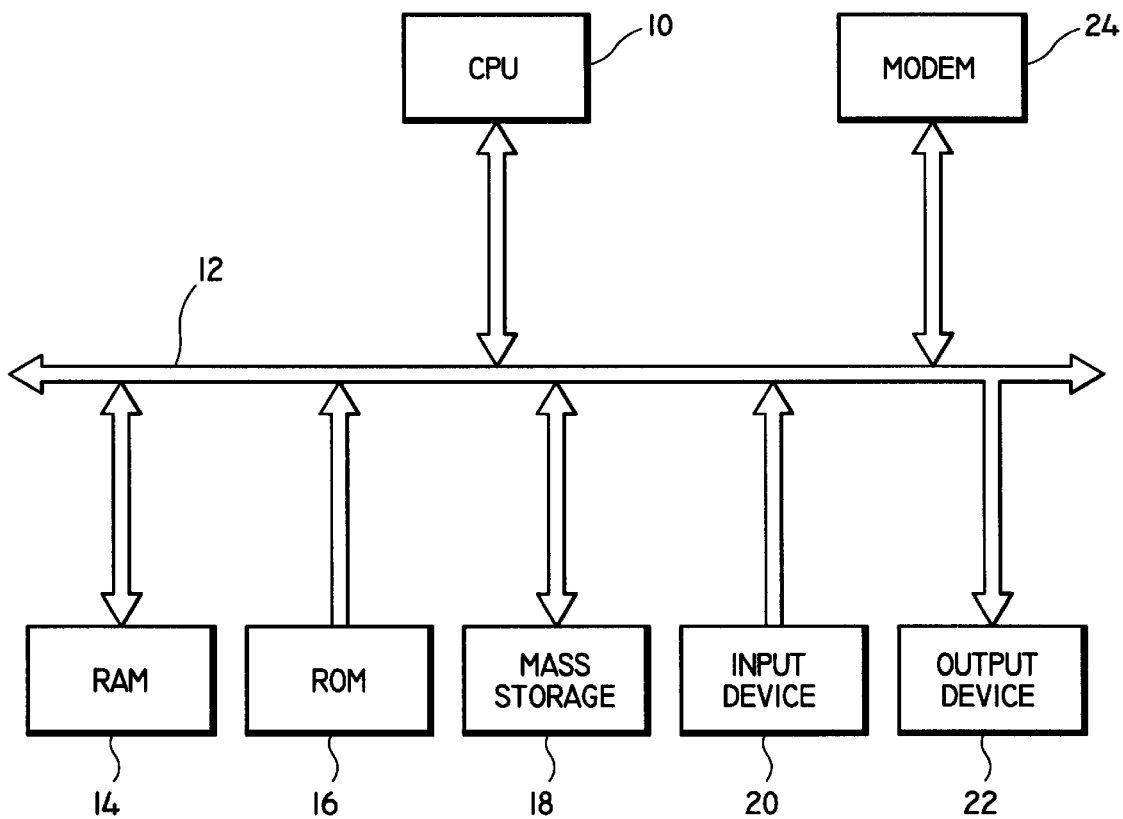
FIG. 2 is a diagram illustrating an exemplary configuration of a client machine and server computer for implementing features of the invention.

FIG. 2 illustrates an exemplary configuration of a client machine 100 including a CPU 10 operatively coupled to RAM 14, ROM 16, mass storage device 18, input device 20 and output device 22 via bus 12. It is to be appreciated that the components of the present invention, to be described in detail herein in accordance with the related figures, are implemented as software modules stored in ROM 16 and/or mass storage device 22 and, as required, loaded into RAM 14, over bus 12, and executed (run) by the central processing unit 10. The CPU 10 running the software modules may be responsive to user input provided by input device 20, e.g., keyboard, keypad, mouse, touchscreen. Further, the CPU 10 running the software modules may output results therefrom to output device 22, e.g., display, printer, speaker. Also, a modem device 24 is operatively coupled to the bus 12 which provides the communication interface between the client computer and the network of servers. Accordingly, while FIGS. 1, 3, 4, 6, 8 and 9 could be considered block diagrams of apparatus for carrying out the invention, such figures may also be considered flow diagrams. In this regard, it should be appreciated that since the invention is carried out utilizing one or more suitably programmed general purpose digital computers, e.g., as shown in FIG. 2, the functional elements depicted in the figures are exemplary of functional elements which would be established within the computer by such programming. Thus, said figures may be considered to illustrate a suitable and preferred processor architecture for practicing the invention which may be achieved by programming of a general purpose processor, e.g., CPU 10. Of course, special purpose processors configured in the manner depicted in said figures may be employed.

In addition, as shown in FIG. 1, it is to be understood that the web page adaptor server 107 and servers 104 and 114 may have similar architectures as shown in FIG. 2 and, as a result, the functional elements shown in the figures relating thereto may be software modules executed on one or more general or special purpose processors, as explained above.

As mentioned, and a key impetus for the present invention, the display 113 for a client machine 100 may include different sized, shaped and configured monitors (displays), as shown in a few examples illustrated within block 113, e.g., a standard PC monitor (113*a*), a multiscreen PC system (113*b*), a laptop display (113*c*), a webphone (113*d*), and a watch display (113*e*). Of course, the types of displays shown in block 113 are exemplary and not intended to be an exhaustive illustration of the types of displays which may be used in accordance with the invention. Also, each display may include various sized windows (shells) for displaying icons and information. Examples of such windows are shown on some of the display types shown in FIG. 1 (113*a*–113*d*) and denoted as windows 115.

Given the above-described interconnectivity of a preferred display screen and window size related web page adaptation system of the invention, the operation thereof will now be explained. The client 100 sends (via modem 24) a request message 102, conforming to the URL (uniform resource locator) standard, at some port using standard TCP-IP Internet connection 108 to a server machine 104. The port protocol between the client machine 100 and the server 104 is preferably HTTP (hypertext transport protocol). As is known, the URL serves as the address that defines the route to a file on a server computer on the World Wide Web or any other Internet facility. The request message 102 conforming to the URL standard, thus, provides the client with access to web pages which, themselves, have URLs embedded therein to provide hypertext links to other pages.

Simultaneously with the request message 102, a client sends a display mode message 103. This display mode message 103 includes several characteristics or parameters of the client display 113. One parameter is a display size that is represented as a height and width (e.g., 360 by 400 pixels). Other characteristics can include, for example: a character format and size; memory related information such as, for example, a memory address; window size, etc.

The memory address information is specific to the operating system running on the client's machine 100, i.e., Windows 95, OS2, etc. For instance, Windows 95 uses a linear addressing model that provides access up to 4 GBytes of RAM. The 4 GBytes of potential addresses is divided into 4 kByte sections, each of which is called a page. A page table is used to map virtual addresses to physical memory locations. The first megabyte of memory is used for MS-DOS virtual machine operations. The addresses between 4 MBytes and 2 GBytes are used by 32-bit programs as their base operation. Each running 32-bit application gets its own local map of these two gigabytes of addresses. When a program calls an address, it is translated internally by the Windows 95 virtual memory manager into the physical memory address that contains the information that the program wants to access. Previous versions of DOS and Windows divided memory into conventional, expanded and extended memory specifications. The memory related information allows to calculate how much memory is available to display stored information. This information is needed for organization of data for display, for fast access to data, etc. When addresses of different kinds of data are given, a storage for some data allocation can be found as the difference of these addresses.

The display mode message can be represented as a mode number that uniquely defines display parameters. For instance, it is contemplated by the invention that tables may be created which contain display characteristics or parameters associated with a given display terminal and each table can be identified by a unique mode number. Eventually, if the adaptor server 107 contained tables (stored in its mass storage 18) of most common display parameters associated with display screens, then the user's machine 100 need only transmit the mode number and, in response, the adaptor server 107 could locate the appropriate table and use the information accordingly.

Still further, additional requirements specified by a user of the client machine 100 can preferably be included in the display mode message 103. These additional requirements may relate to sizes and shapes of icons, fonts, priorities, depth, etc., as will be explained. An example of a display mode message 103 with user requirements is shown in FIG. 5. A display mode message 103 can be stored in a special file. In Windows95/NT machines, a display mode message can be stored in registry. Another place where a display mode messages may reside is within "cookies." As is known, cookies are messages that supply a web browser with information about user preferences.

The request message 102 defines a connection (route) 109 by a server 104 to a web site 106 and web pages from the web site 106 are sent back to the server 104 via connection 110. Phantom lines drawn through the server 104 in FIG. 1 serve to illustrate the path direction functions that the server 104 performs. Other conventional functions may be performed by the server 104. Nonetheless, in the server 104, the display mode message 103 and the content of the web pages received over connection 110 are sent to web page adaptor server 107 via a connection 110a. While server 104 shows that the display mode message is routed to the web site and then to the adaptor server 107 with the web page data from the web site, it is to be understood that this is not necessarily required and thus the display mode message could be sent directly to the adaptor server 107 from the server 104. Advantageously, the web page adaptor server 107 transforms web pages received from web site 106, via server 104, to adapt the content of the web pages to the size of the display 113 and also to satisfy the user's requirements as specified in the display mode message 103. Some examples of operations that the web page adaptor server 107 performs are the following: stripping objects from a web page if the display size of display 113 is small or adding content of links to a web page if the display size of display 113 is large. A detailed description of the web page adaptation operation of the web page adaptor server 107 will be given below in the context of FIGS. 3, 8 and 9. The web page adaptor server 107 can also provide transformations of web pages obtained from other server machines, denoted as servers 114 in FIG. 1, in the same way as for the server 104. That is, a single server 107 may service a plurality of other servers on the network.

The transformed set of pages from server 107 are sent to the server 104, via connection 111a, and then onto the client machine 100 from the server 104, via connection 111. The adapted set of web pages can be either displayed on the display device 113 or sent to the client web page adaptor module 112. The adaptor module 112 is preferably installed at the client machine 100. The adaptor module 112 performs additional specific operations that may not be available at the web display adaptor server 107. One of the most important such local operations is adaptation of web pages to a window or shell. A window or shell can occupy a fraction of the screen of the display device 113 and is typically characterized by smaller sizes. A detailed description of the operation of the client-based web page adaptor module 112 is given below in the context of FIG. 4.

Figure 3:
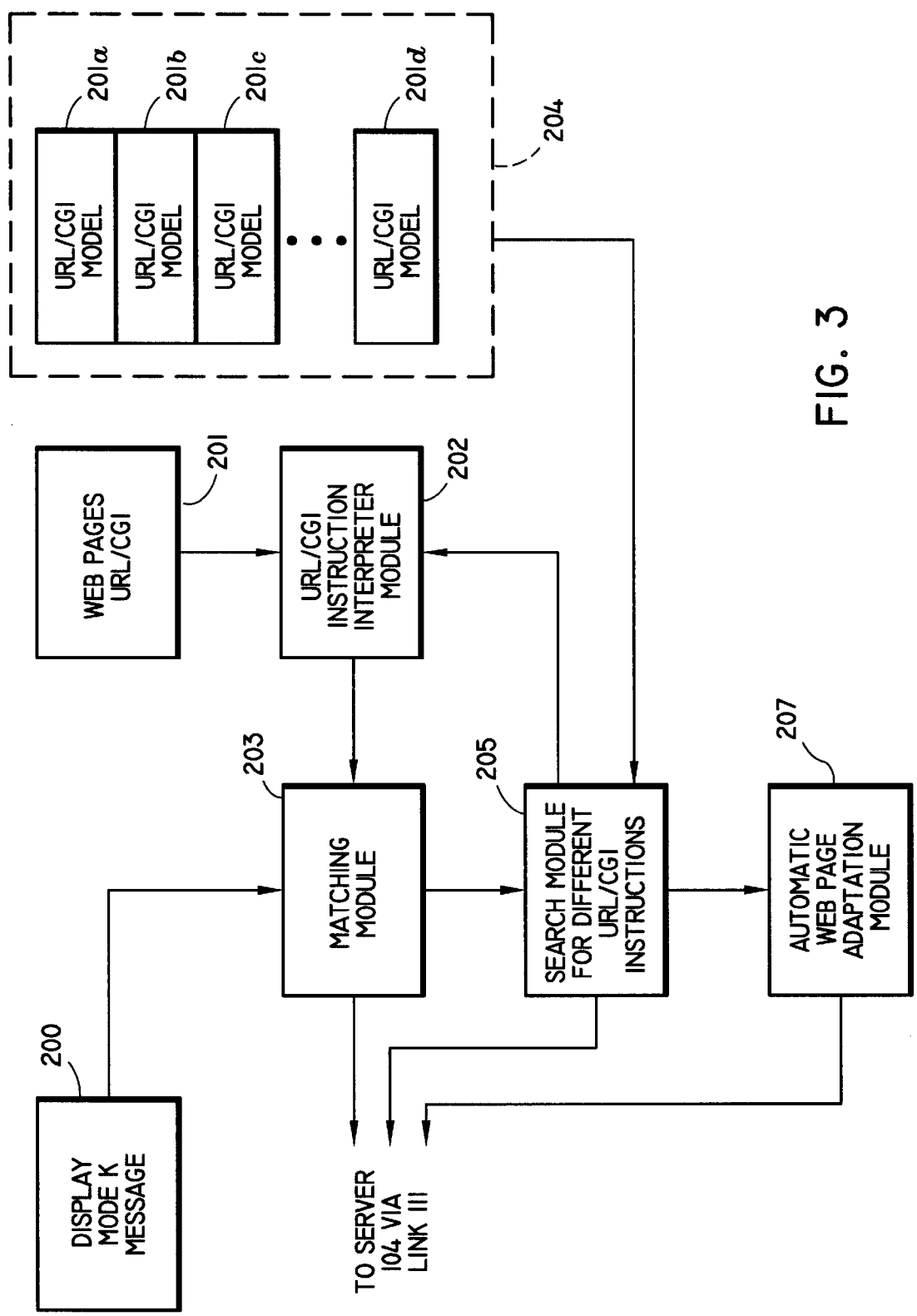
FIG. 3 is a diagram of a web page adaptor server according to the invention.

Referring now to FIG. 3, a diagram illustrating the web page server adaptor 107 and operation thereof is shown. The content of web pages 201 (e.g., URL/CGI information), received from the web site 106 via the server 104, is provided to a URL/CGI instruction interpreter module 202. The interpreter module 202 interprets the URL/CGI instructions. That is, the interpreter module 202 receives the web page data containing the URL/CGI instructions and reads, therefrom, numeric data associated with the URL/CGI textual instructions. Such numeric information includes, for example, icon and picture sizes, fonts, lengths of text and locations where these items are to be placed in the displayed web page. It is to be understood that the basic URL/CGI instructions, which include this numeric data, are provided by a web page designer. Web pages produced via basic URL/CGI instructions will typically fit either a format of a display of a designer's computer or fit most typical monitors belonging to users who usually visit the designer's web site. However, therein lies the problem that requesters of such web pages face when attempting to view such information on a screen that does not fall into one of the categories of screens for which the web page designer designed the data to fit. As mentioned, such a problem is part of the impetus for the present invention. An example of the types of numeric data that are included in a typical URL are shown in block 500 of FIG. 6.

It is to be understood that CGI refers to Common Gateway Interface (CGI) scripts which, as is known, are programs written in a script language which function as the glue or interface between HTML (Hypertext Markup Language—the document format used on the World Wide Web) pages and other programs, e.g., database programs. The phrases URL and URL/CGI are generally used interchangeably throughout this description.

The interpreter module 202 then provides the numeric data read from the basic URL/CGI instructions to a matching module 203. Also provided to the matching module 203 is the display mode message 200 (same as 103 in FIG. 1) which contains the information about the size and characteristics of the user's display 113 (FIG. 1). The matching module 203 then compares the display parameters from the display mode message to the numeric data received from the interpreter module 202 to determine whether objects (icons, pictures, texts, links, etc.) included in the web page data will fit the particular size of a user's display.

In other words, the matching module 203 checks whether reconstruction of all of this web page data will fit a display size, given the information contained in the display mode message. If the matching module 203 determines that the web page representation substantially matches the display size, i.e., the web page data as designed by the web page designer will fit the user's display, the web page data is sent to the server 104, via connection 111a (FIG. 1), to be forwarded to the client machine 100.

Otherwise, alternative URL/CGI instructions 201a–201d are provided to a search module 205. It is to be appreciated that these alternative URL/CGI instructions 201a–201d are model URL/CGI instructions provided along with the main URL/CGI instructions 201 to the adaptor server 107 and stored in a memory store 204. These alternative models include textual instructions which include alternative numeric information relating to, for example, icon and picture sizes, fonts, lengths of text and locations where these items are to be placed in the displayed web page. Preferably, the alternative URL/CGI instructions may include a special instruction as a first instruction which indicates what type of display screen size is optimal for displaying the web page data associated with that particular URL/CGI instruction set. The special instruction may be general or approximate in identifying the optimal display intended. For example, the special instruction may indicate that the web page data is intended for display on PC displays, laptop computer displays, or palmtop computer displays. Alternatively, the special instruction may be precise in that it describes an intended pixel display area, e.g., N×M pixels. Thus, with this special instruction in each alternative URL/CGI model, the search module 205 can quickly compare the information in the respective special instructions to the display mode message information (available from the matching module 203 or directly from server 104) and determine which, if any, model is the optimal model for the user's display screen. If an optimal model is found in this fast search, the search module provides the instruction set to the server 104 which then transmits the set to the client's machine 100 for display. It is also to be understood that the search module 205 searches for the closest matching screen size from a set 201a–201d. That is, if the module 205 finds a URL/CGI file with parameters that approximately coincide with the display mode k obtained in message 200, then the module 205 sends this URL/CGI file to the server 104, via connection 111a (FIG. 1), to be forwarded to the client machine 100. For example, if the display mode k in message 200 contains a parameter for a display size such as 370 by 380 pixels, this size can be considered as a close enough match to an available screen size of 360 by 400 pixels as defined in one of the URL files 201a–201d.

In the case where the alternative URL/CGI instructions do not have a special instruction for quick comparison, as described above, then the model is sent to the interpreter module 202 where the numeric data is read from the instruction and then sent to the matching module 203 for a full data comparison, as explained above. Therefore, before adapting the web page data, the interpreter module 202, the matching module 203 and the search module 205 attempt to find a close enough match to the display mode message with the existing URL/CGI (basic and alternatives) instructions provided by the web page designer.

Now, if an optimal match is not found using the original URL/CGI instructions or using alternative models, then the original URL/CGI instructions (web page URL/CGI 201) or closest alternative URL/CGI model 201a–201d is sent to an adaptation module 207 (as shown in FIG. 3, through the search module 205). In the web page adaptation module 207, web pages are, for example, folded into several pages, objects stripped and links stripped and re-mapped if the user's display size is smaller than the display size used for the web pages defined in 201. On the other hand, if the user's display size is larger than the web page design intended, objects and links can be added to the web page. The detailed description of the automatic web page adaptation module 207 will be explained below in the context of FIG. 8. However, two examples of web page adaptation according to the present invention will first be described in the context of FIGS. 6 and 7.

Figure 6:
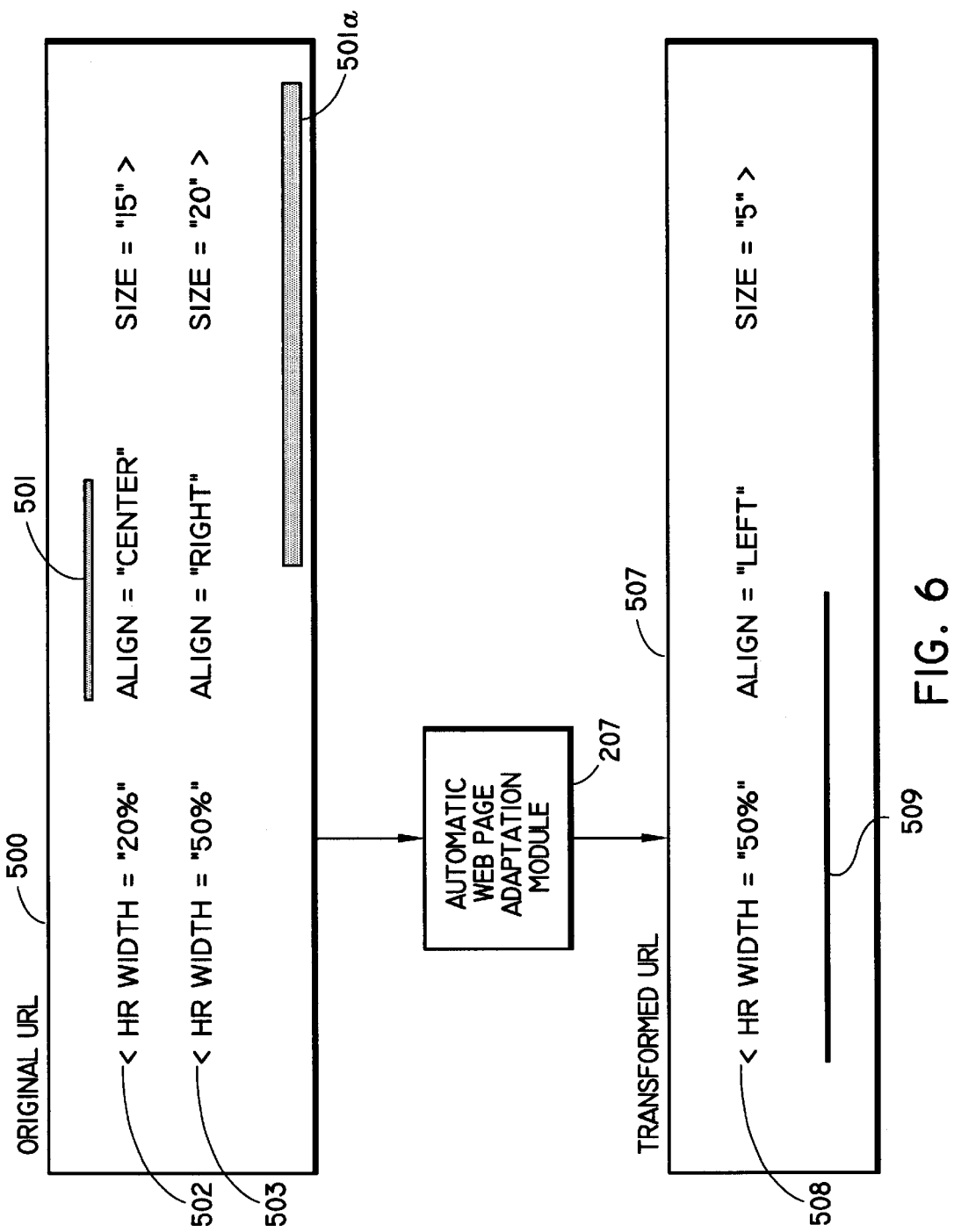
FIG. 6 is a diagram illustrating an example of interpretation of URL instructions and matching with a display or window size.

FIG. 6 illustrates a block 500 which represents a part of an original URL/CGI instruction which consists of instruction lines 502 and 503. The instruction 502 describes a location, width and size of a line segment 501. Similarly, instruction 502 describes attributes of a line 501a. In these instructions "HR" places a horizontal line on a page; "Width='percent'" specifies the relative width of the line as a percentage of the current display width; "Align='left/right/center'" specifies the alignment of horizontal lines that are less than the full width of the page; and "Size='number'" specifies the vertical thickness of the line in pixels. These URL instruction lines are processed by a URL transformation module of the adaptation module 207 which accepts as input, parameters of a new window or display size interpretation of web graphic elements and content from a web content interpreter of the adaptation module 207.

For example, the module 207 interprets a symbol "HR" as a decorative element, an underlying element (e.g., underlying some word or picture), or a separation element (e.g., separating different parts of the page). Depending on the content of other elements in the page (not shown in FIG. 6), the module 207 decides that the instruction line 503 has a decorative purpose only and that the instruction line 502 bears more important semantic purpose (e.g., to underline some picture or text).

Sometimes underlying lines on web pages are used to show which words are links. Typically, only words that are underlined are links. Clicking a mouse on the underlined word activates the link. Thus, it is important to preserve the functionality or semantic property of theses lines in the adapted web pages. However, it is usually true that not all underlined words are links. Rather, the underlining on some words is decorative (i.e., not functional with respect to links). Accordingly, URLs could be modified by web site designers for use with the invention to provide an instruction in the URL to indicate whether a line is functional or decorative.

A new URL 507 for a new smaller window or display size is constructed in which instruction line 503 (corresponding to line 501a) is dropped altogether. The instruction line 502 is transformed into a new instruction line 508 in which the corresponding line 509 takes up 50% of the new total display (e.g., since this new display is smaller) and alignment of the line is shifted to the left (e.g., since there is not enough space to place the line at the center as it is in URL 500). Also, the vertical thickness of the line 509, as shown, may be made thinner than in URL 500.

It is to be appreciated that such example lends itself to an understanding of how the adaptation module 207 may implement FSA. That is, such interpretation may be done using FSA methodology in which states correspond to some words of a URL script and to a size of a display that is available, etc. Then, rules would be represented by arcs and would require particular actions depending on the desired results.

Referring now to FIG. 7, an example of an original web page and a stripped-version of the web page for Yahoo news is shown. As is known, Yahoo is a web service which provides information and links the other services. Particularly, original web page 701 is shown as it may normally be displayed on the screen of a conventional personal computer, while web page 702 is shown after the adaptation process performed by adaptor server 107 as a stripped down version of the original web page 701. Page 702 may be displayed on a device with a smaller display, such as a webphone. It is to be appreciated that the example in FIG. 7 merely shows one simple example of the adaptation process of the invention and, as mentioned, among other things, web pages may also be expanded (objects and links added), if the user's supplied display size is greater than the display size needed for displaying web pages 201.

Figure 8:
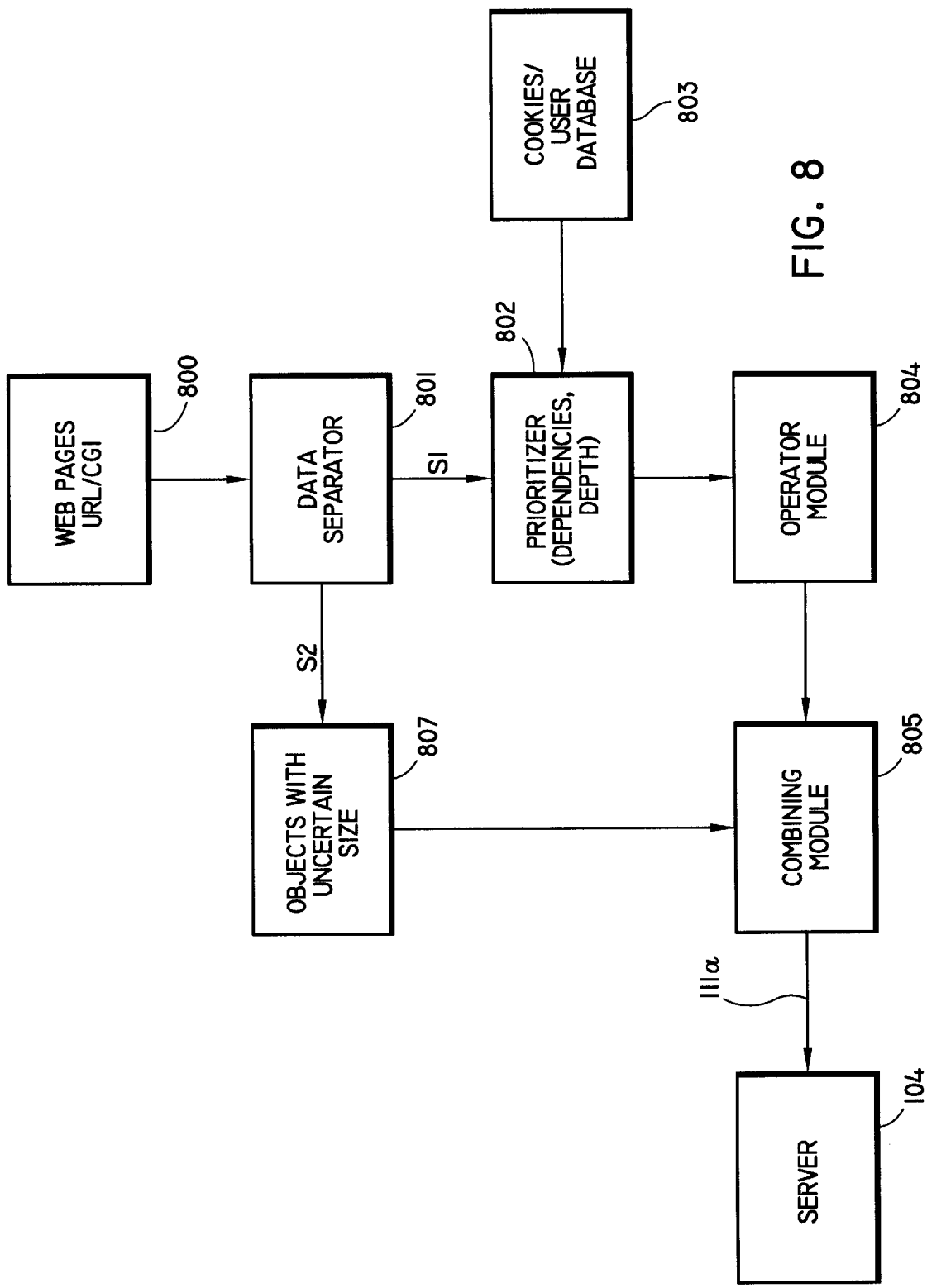
FIG. 8 is a diagram illustrating an automatic web page adaptation module according to the invention.

Now, a detailed explanation of the automatic web page adaptation module 207 will be given. Referring now to FIG. 8, web page data (URL/CGI instructions received by module 207 through the search module 205 in FIG. 3) is represented as block 800. As explained, web page data consists of visual objects of different types, e.g., icons, text, graphic images. These objects have different sizes and locations when they are represented on a screen. For some of these visual objects, it can be estimated whether the objects fit a screen of a certain size directly from a script (e.g., URL) where the objects are described. But for some visual objects (e.g., compressed graphic images stored in some format), such information is not available until the object is actually displayed on a screen and the size of the object is measured.

Thus, the web page data 800 is first provided to a data separator module 801 which separates the web page data using the above-described criteria. The data separator module 801 splits data items (e.g., icons, links, text, graphic images) from the web page data 800 into two groups, S1 and S2. The first group, S1, includes data items whose sizes can be estimated from a web script (e.g., URL/CGI instructions). The second group, S2, includes remaining items. The objects in group S1 are sent to a prioritizer module 802 for further transformations and reorganization in new web pages that fit a particular screen size, as will be described below. Objects in group S2 (denoted as block 807) are eventually combined, in a combining module 805, with objects in group S1. Objects from group S2 are presented in web pages as links that are inserted in adapted web data S1.

As mentioned, objects in group S1 are prioritized in the prioritizer 802. Therein, objects are numerated in accordance with their importance. The priority is taken into account in further transformations of web pages. For example, if a first object has higher priority than another object and both objects cannot together fit a small display screen, then the object of higher priority is displayed on the screen and the object of lower priority is displayed as a hypertext link to another (newly created) web page where such lower priority object can be fully displayed. An example of prioritization is illustrated in FIG. 10.

Figure 10:
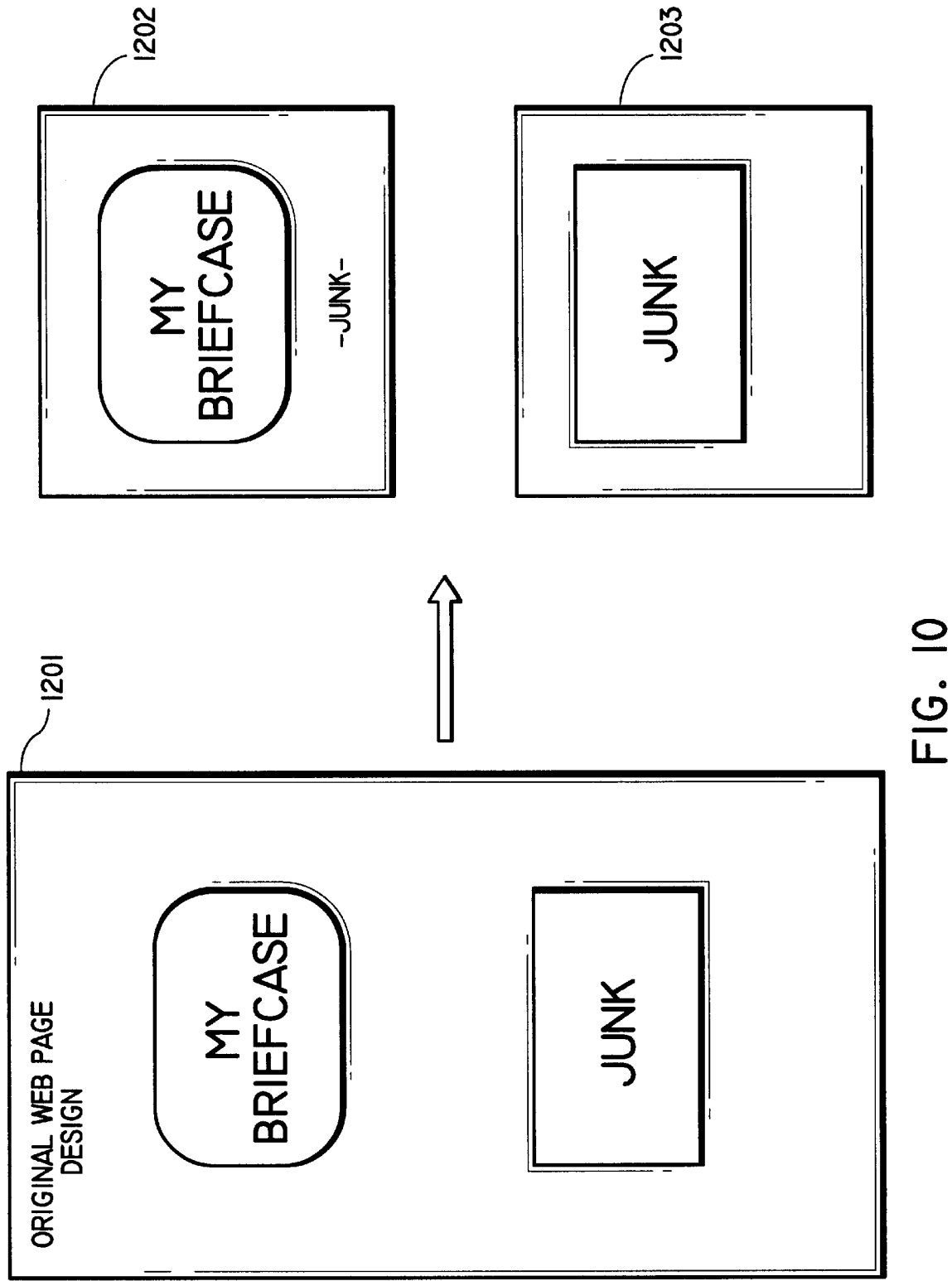
FIG. 10 is a diagram illustrating an example of prioritization dependent web page representation according to the invention.

In FIG. 10, block 1201 denotes an original web page that is designed for an average sized display screen. On this web page 1201, two icons are displayed: "My briefcase" (with priority 1) and "Junk" (with a lower priority 2). However, since a user may be viewing the content of the original web page 1201 on a reduced sized display screen, such reduced screen may fit only one icon. Thus, in accordance with the invention, the highest priority icon "My briefcase" is displayed on a reduced web page 1202 on such display screen. Further, rather than the whole icon "Junk" being displayed on the web page 1202, the page 1202 contains a textual (hypertext) link in the form of the word "Junk" (at the bottom of page 1202) that points to the whole icon "Junk" on another web page 1203. When this link is activated (e.g., by selecting the word "Junk" on page 202 by clicking a mouse on the word in a conventional manner) the web page 1203 is displayed on the user's display screen on which the icon "Junk" is displayed. Prioritization depends on such factors as, for example, the importance of information contained in an object and/or how often this object (link) is visited by this particular user or all users. Such information used to make priority decisions may be obtained from information previously enrolled by, or extracted from, a user and stored in a user database 803. This information may include, for example, user profiles, histories of visits to particular web sites by users, statistics of visits to particular web sites depending on user profiles. The database 803 may also contains "cookies" with information about user preferences. As is known, a cookie is a data file created by a web server which may be stored on a user's computer and which provides a way for the web site to keep track of a user's patterns and preferences. For example, the cookies may contain, among other things, URLs previously entered by a user and, the next time the user's web browser program encounters those URLs again, the web browser sends specific cookies to the web server. These specific cookies may contain, for example, the user's ID which would save the user from having to type this information in again upon a second and subsequent visit to that web site.

Another criteria for making priority decisions in order to determine what and how to display web objects is the dependencies associated with these objects. For instance, assume that an object O1 is dependent on an object O2, if one of the following conditions are fulfilled: (1) every item (or most of the items) in O2 can be accessed from O1, meaning that if object O1 is activated (e.g., by clicking a mouse on O1) then, among other things, objects that are accessible from O2 are displayed; (2) items that are accessed from O1 contain most of the information that is described in items that are accessed from O2; and (3) items that are accessed from O1 refer in some way to information that is contained in items that are accessed from O2, for example, items in O1 are titles or abstracts of articles in O2. Other criteria of dependencies, for example, indicated in cookies, can be chosen by users.

Prioritization of objects in accordance with the invention preferably takes into account dependencies. That is, objects that depend on other objects have lower priority. If an object O2 is dependent on an object O1, and an object O4 is dependent on an object O3, and O1 has a higher priority than O3, then O2 has a higher priority than O3 and O4.

Different prioritization can be put on different words that point to different links and have different dependencies. For example, a typical line on a Yahoo News web page appears as follows:

Business—Headlines—Summaries—Financial—Quotes—Motley Fool 6:43 am est

Each underlined word in the above line points to a different link. In accordance with the invention, "Headlines" can be prioritized as follows:

Headlines—1

Summaries—1A

Quotes—2

Financial—2A

Motley Fool—2B

Headlines object points to titles of stories and Summaries object points to summaries of these stories. Accordingly, Headlines is assigned higher priority than Summaries, since essential objects that are described in Summaries are accessed from Headlines and objects in Headlines are smaller than objects in Summaries (i.e., since titles of stories are shorter than summaries of these stories). Similarly, Quotes is assigned a higher priority then Financial and Motley Fool, since most of information in Financial and Motley Fool can be accessed from Quotes.

Such dependencies imply that the prioritization for these items may be represented in a column with priority decreasing in order from top to bottom.

The prioritizer module 802 also preferably operates in accordance with the concept of "depth." Depth defines a number of pages that are screen adapted in a single user call (i.e., when a user sends a request 102 from a client machine 100, as shown in FIG. 1). The following description explains the notion of depth in more detail.

Web page data 800 consists of pages that are defined in a single URL/CGI file. These pages are downloaded to a user's client machine 100 (FIG. 1) via the server 104 (FIG. 1). These pages may contain links to other objects with data on other web sites. If the user activate these links (e.g., clicking a mouse on these links), new web pages are generated from web sites located at addresses associated with these links. These new web pages also need to be adapted to the user's screen. These new web pages also can contain new links to objects. This process of web page generation can conceivably go on infinitely and, as a result, it may not be possible to screen adapt all of the possible web pages in one user call. The number of pages that are screen adapted, in accordance with the invention, in a single user call can be limited via a value associated with the concept of depth. Several definitions of depth may be implemented in accordance with the invention. The invention is not limited to only the exemplary implementations described herein.

Figure 11:
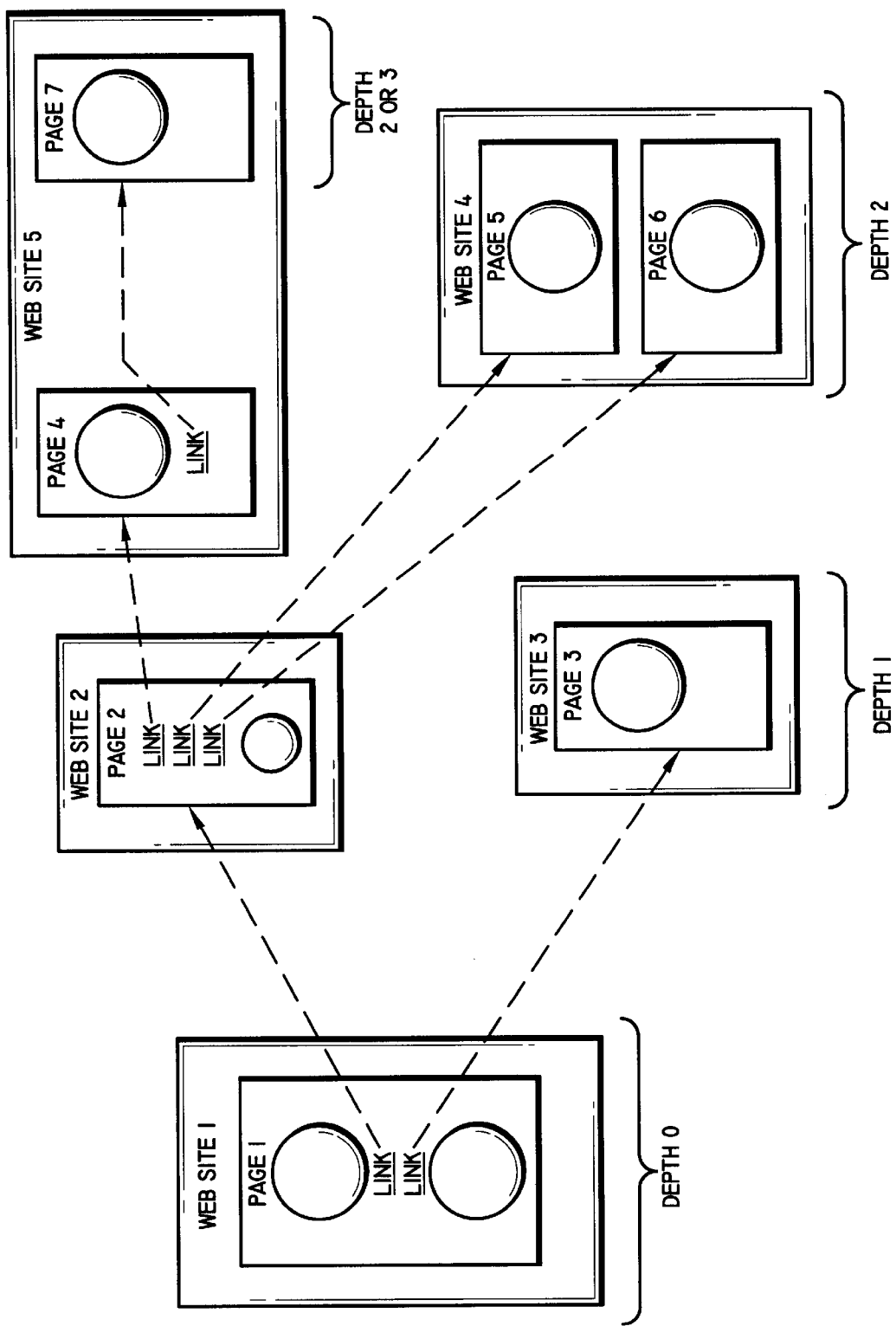
FIG. 11 is a diagram illustrating an example of depth web page representation according to the invention.

Consider the diagram shown in FIG. 11. A web page 1 (from a web site 1) is shown. This page contains several objects (circles) and links. Assume that the depth of page 1 is defined as zero (0). Further, links on page 1 refer to page 2 (from a web site 2) and page 3 (from a web site 3). Assume that the depth of pages 2 and 3 is defined as one (1). Still further, page 2 has links to pages 4 (from a web site 5) and to page 5 and 6 (from a web site 6). Assume that the depth of pages 4, 5 and 6 is defined as two (2). Also, page 4 has a link to page 7 (from the same web site 5). It is to be appreciated that the depth of page 7 can be defined as either two (2) or three (3). A depth of three is readily understood due to the fact that page 7 is accessed through page 4, which itself has a depth of two. However, one can also take into account the fact that page 4 and page 7 are located on the same web site 5 and can be downloaded in a single user request from page 2. Thus, the depth of page 7 may have the same depth of page 4, i.e., two. Different definitions for depth can be defined by a user or by some default. Accordingly, when a depth N is defined in the prioritizer 802, prioritization and dependencies are defined for all objects belonging to pages of a depth less than or equal to N.

It is to be appreciated that the depth may be defined for use by the prioritizer 802 in a number of ways. The desired depth value may be chosen by the user and transmitted to the adaptor server 107 in a cookie or automatically set and conveyed to the adaptor server 107 in the display mode message. Alternatively, a default value (e.g., 3) may be fixed at the adaptor server 107. Depth may also be defined dynamically using some criteria, e.g., time or volume.

In the case of using time as the criteria for dynamically adjusting the depth value, it is to be understood that the time to adapt a web page according to the invention varies depending on how much the web page must be transformed to fit the user's screen. For example, if a user requests a web site with several web pages, e.g., 5, each requiring a moderate amount of adaptation, this may take the same amount of time to adapt fewer, e.g., 2, more complex web pages. Thus, a time threshold may be specified (again, by the user in a cookie, automatically in the display mode message, or as a default at the server 107), such that the depth value changes depending on the time it takes to adapt requested web pages.

In the case of using volume as the criteria for dynamically adjusting the depth value, the depth value may be set to specify a limit on the amount of data to be adapted Since every link on an adapted page points to a new page which may, itself, have links to other pages, it is easy to see that the amount of information to be adapted can grow exponentially. Thus, a data volume limit may be specified thus causing the depth value to depend on the amount of data associated with the adapted web pages requested by the user.

Alternatively, semantics may be used as criteria for dynamically adjusting the depth value in conjunction with time or volume. In such case, depth can be made dependent on the type of information being adapted. That is, the term "finance" may be specified (again, by the user or in the display mode message) and only web pages having this semantic context are adapted. However, either a time or volume constraint would also need to be specified to put a finite bound on the depth.

After the web data is prioritized in the module 802, the web data is sent to the operator module 804 where new web pages are generated that are adapted to a particular screen size. The operator module 804 is described in detail in the context of FIG. 9 as follows.

Figure 9:
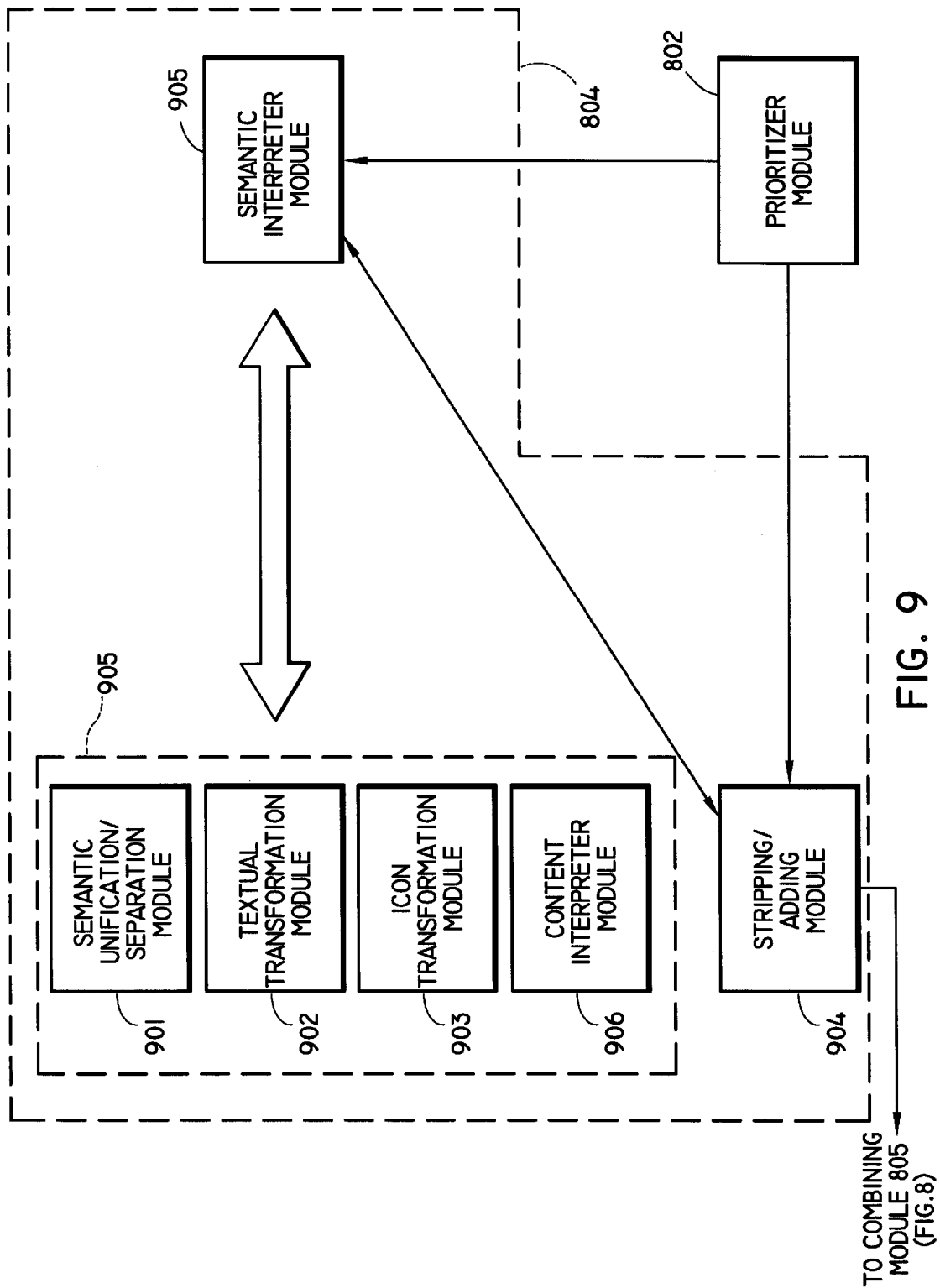
FIG. 9 is a diagram illustrating an operator module according to the invention.

The operator module 802 is comprised of a stripping/adding module 904 and a semantic interpreter module 905 which, itself, includes functional modules such as a semantic unification/separation module 901, a textual transformation module 902, an icon transformation module 903 and a content interpreter module 906. It is to be appreciated that the components 901, 902, 903 and 906 of module 905 are shown in FIG. 9 as an exploded view and denoted as module 905 within phantom lines. The phantom lined view of module 905 is merely intended to illustrate further detail of the solid lined view of module 905.

In the block 901, objects that contain or point to information with the same or similar topics are combined into one set. An icon or button is created on an adapted web page that is linked to the combined data. A new name is chosen to characterize the combined data. This name is written (or expressed graphically via some symbol) on an icon or a button. For example, in FIG. 13, a typical part of a Yahoo entry panel to news is shown (block 1501). In block 1501, a first word on each line defines a topic of subsequent links (underlined words). For example, the word BUSINESS in the first line defines the content of links Headlines, Summaries, etc., the word TECHNOLOGY in the second line defines the content of subsequent links in this line, and so on.

A small display screen is represented by block 1502. The data from web page 1501 is transformed into the web page in block 1502 using semantic unification of similar topics. The first line contains a link BUSINESS&TECHNOLOGY that refers to information in the first and second lines in block 1501. The second link in the first line in block 1502, SPORTS&ENTERTAINMENT, refers to data on the third and fourth lines in block 1501. The first link in the second line in block 1502 is WORLD and points to data in the fifth line in block 1501. The second link in the second line in block 1502 is HEALTH and points to data in the sixth line in block 1501. The third link HEALTH points to the sixth line in block 1501. The third link OTHERS points to the remaining data in block 1501 (i.e., seventh line on WEATHER and eighth line on HUMAN INTERESTS). If a user activates the link BUSINESS&TECHNOLOGY in block 1502, an example of what may be displayed on the adapted screen according to the invention is shown in block 1503. The web page 1503 contains six links: HEAD. and SUM. under BUSINESS, HEAD. and SUM. under TECHNOLOGY, QUOTES and MOTLEY under FINANCES. In page 1503, HEAD. is the abbreviation for HEADLINES, SUM. is the abbreviation for SUMMARIES, QUOTES is the abbreviation for FINANCIAL QUOTES and MOTLEY is the abbreviation for MOTLEY FOOT. Thus, activating SUM. under BUSINESS in 1503 serves to display a content of the link SUMMARIES in the first line in 1501, activating MOTLEY displays a content of MOTLEY FOOT in the first line in 1501, and so on.

The semantic interpreter module 905 separates objects on web pages that refer to different topics and combines (unifies) objects that refer to the same or similar subjects. These semantic operations are based either on instructions of web designers or may be performed automatically. The overall module 905 provides semantic interpretations of web objects that are needed for block 901. Semantic interpretations in block 901, for example, may define what objects are semantically close (i.e., have similar topics), what part of a link definition is relevant to a topic, etc.

Figure 13:
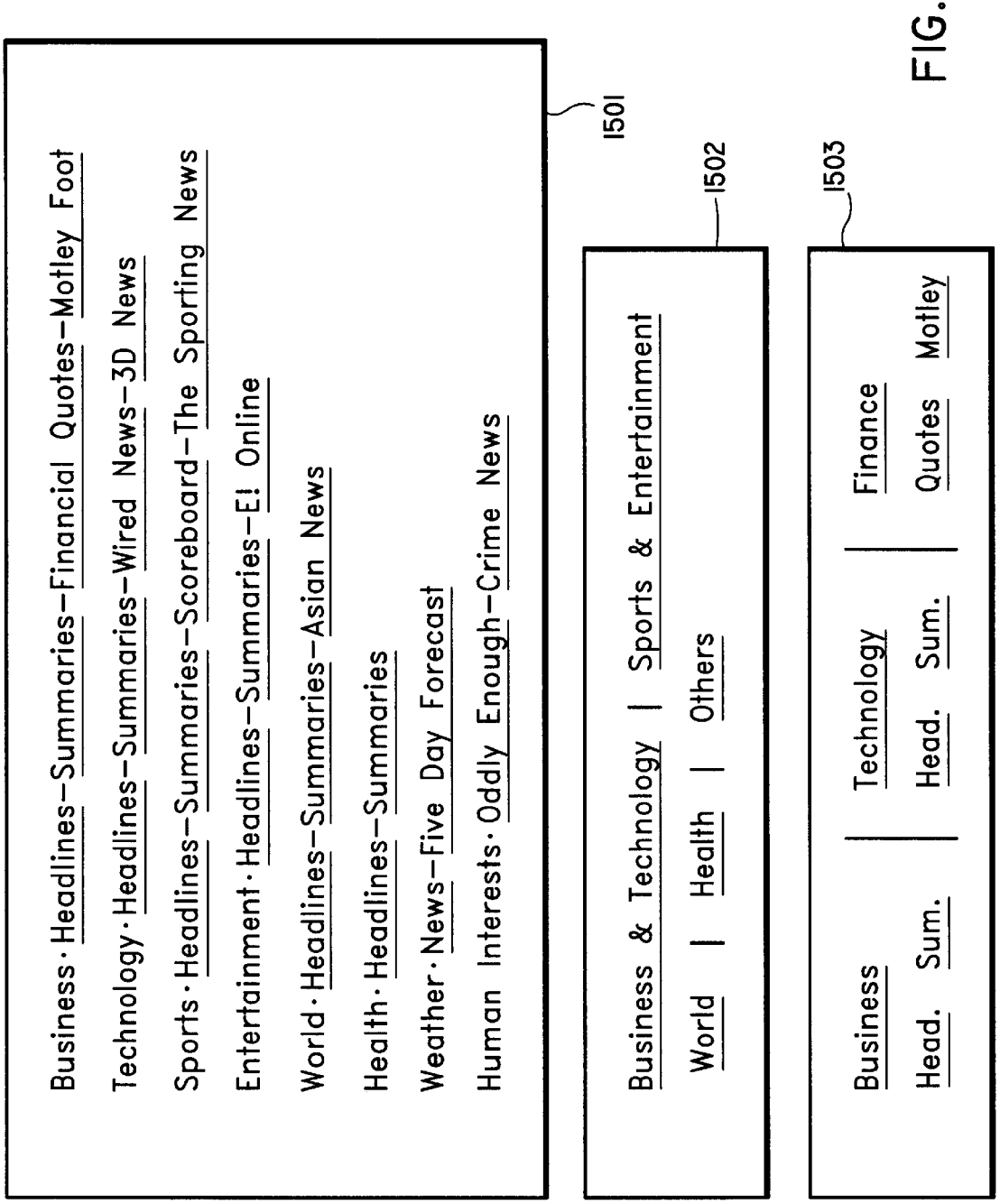
FIG. 13 is a diagram illustrating an example of adaptation of a web page via semantic criteria according to the invention.

In the example in FIG. 13, unification of links under the same topic (e.g., links marked by the first word at each line) may be done by a web designer of the particular web page. Automatic topic identifications of web content can be done by comparing frequencies of (non-finction) words in titles or texts that are linked to objects. There exists methods for identifying whether two words are semantically related. For example, two words are semantically related if they are linked in the same definition of a word meaning in a vocabulary. This allows to build a graph of semantic similarity for words that can be used for topic identification.

The textual transformation module 902 provides for textual operations on web pages to adapt them to a new size (i.e., display screen and/or window). Possible operations on text and words are: abbreviations, deletions, insertions, movements, zoom, font changes, fitting screen form (e.g., squared, round, triangle) as will be explained, etc. For example in FIG. 13, words HEADLINES and SUMMARIES are abbreviated to HEAD. and SUM., respectively. Examples of movements are pairs HEAD. SUM. Which were placed under BUSINESS and under TECHNOLOGY (in 1503). Examples of deletions are QUOTES and MOTLEY in 1503 (the words "Financial" and "Foot" from 1501 were deleted). These textual transformations can be either specified in instructions (URL/CGI) by web designers or produced automatically by the semantic interpreter 905. For example, rules for abbreviations of words (e.g., preserve at least 3 or 4 letters of an original word or preserve a root of a word, etc.) may be implemented automatically by the adaptation scheme of the invention. Also, the semantic interpreter module 905 may define what can be deleted or moved. For example, the semantic interpreter 905 can define that "Financial Quotes" and "Motley Foot" links are related to a topic "FINANCE" and based on this information the textual transformation module 902 creates a topic title FINANCE in 1503 and move links QUOTES and MOTLEY under FINANCE, as shown in 1503.

Figure 14:
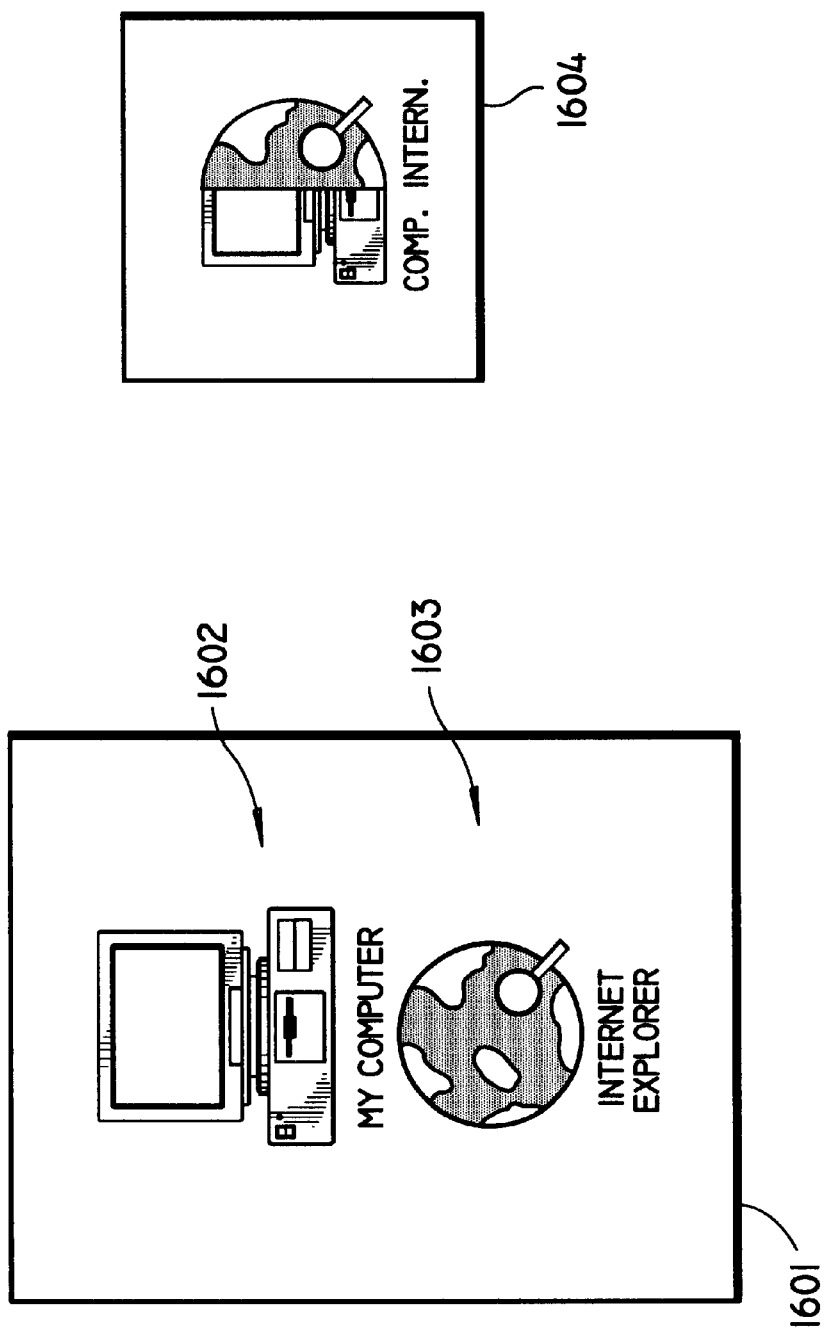
FIG. 14 is a diagram illustrating an example of transformations of icons according to the invention.

The icon transformation module 903 performs transformations on icons to fit them into adapted web screens. Examples of such transformations can include: cutting each icon in half and combining halves of two icons together. An example of such icon transformation is shown in FIG. 14. On web page 1601, two icons "My Computer" (1602) and "Internet Explorer" (1601) are drawn. In accordance with the icon transformation module 903, the two icons are combined into a single icon in a screen adapted web page 1604. In order to activate the "My Computer" object, a user clicks on the left half of the icon in 1604 and in order to activate "Internet Explorer", the user clicks on the right half of the icon in 1604. FIG. 14 also provides another example of textual abbreviations for titles to icons, e.g., "My Computer" to "Comp." and "Internet Explorer" to "Intern.". If several icons are related to the same topic, a new icon may be created for a given topic. A new icon may be created from a database of icons that are related to a topic or from components that are common to several icons. For example, if a portion of several icons contains a common symbol (e.g., a picture of a computer), a new icon can be created that consists only of this symbol. The semantic module 905 performs the task of determining whether icons (or their parts) are semantically associated.

The stripping/adding module 904 provides for addition and/or deletion of objects on web pages, as mentioned above in the context of FIGS. 10 and 13. The module 904 is connected with modules 901, 902, and 903 and provides deletion and/or addition operations with respect to objects in conjunction with these modules. The prioritizer module 802 provides the web page data for use by modules 904 and 905. Objects that have higher priority are less likely to be stripped (deleted and/or moved to another page, object, etc.) from a web page as compared to objects with lower priority. Similarly, semantic interpreter 905 uses priority data to decide what operations in modules 901, 902, 903 should be performed. For example in FIG. 15, if a user rarely accesses the objects WEATHER and HUMAN INTERESTS in page 1501, these objects are more likely candidates to be placed in the object OTHERS on page 1502.

Referring again to FIG. 8, the transformed web pages from the operator module 804 are combined in the module 805 with the data S2 from the module 807. Objects from 807 are of uncertain sizes and, therefore, they are presented in the transformed web pages from module 804 as links to these objects. For example, referring to FIG. 12, an original web page contains objects: ICON 1 and TEXT 2 that belong to group S1 and a PICTURE 3 that belongs to group S2. The first adapted web page 1402 contains objects ICON 1 and TEXT 2 that fit a smaller screen size of a user's display. However, instead of PICTURE 3 being fully displayed on page 1401, a button 1403 is displayed on page 1402, serving as a link to PICTURE 3. Activating this button links the user to a new web page 1404 which is not specially adapted to a screen since the size of picture is not known in advance of display. Thus, the picture may be only partly displayed on 1404 and in order to view other parts of the picture a user may either move the picture (up or down or left or right) or zoom it to an appropriate size.

Accordingly, after web data in groups S1 and S2 is combined in combining module 805, the combined web data is output by the automatic web page adaptation module 207 (FIG. 3) and sent to the server 104 via connection 111*a* (FIG. 1). The server 104 then sends the web pages, advantageously adapted in accordance with the invention, to the client machine 100 via connection 111 for viewing by the user.

Figure 4:
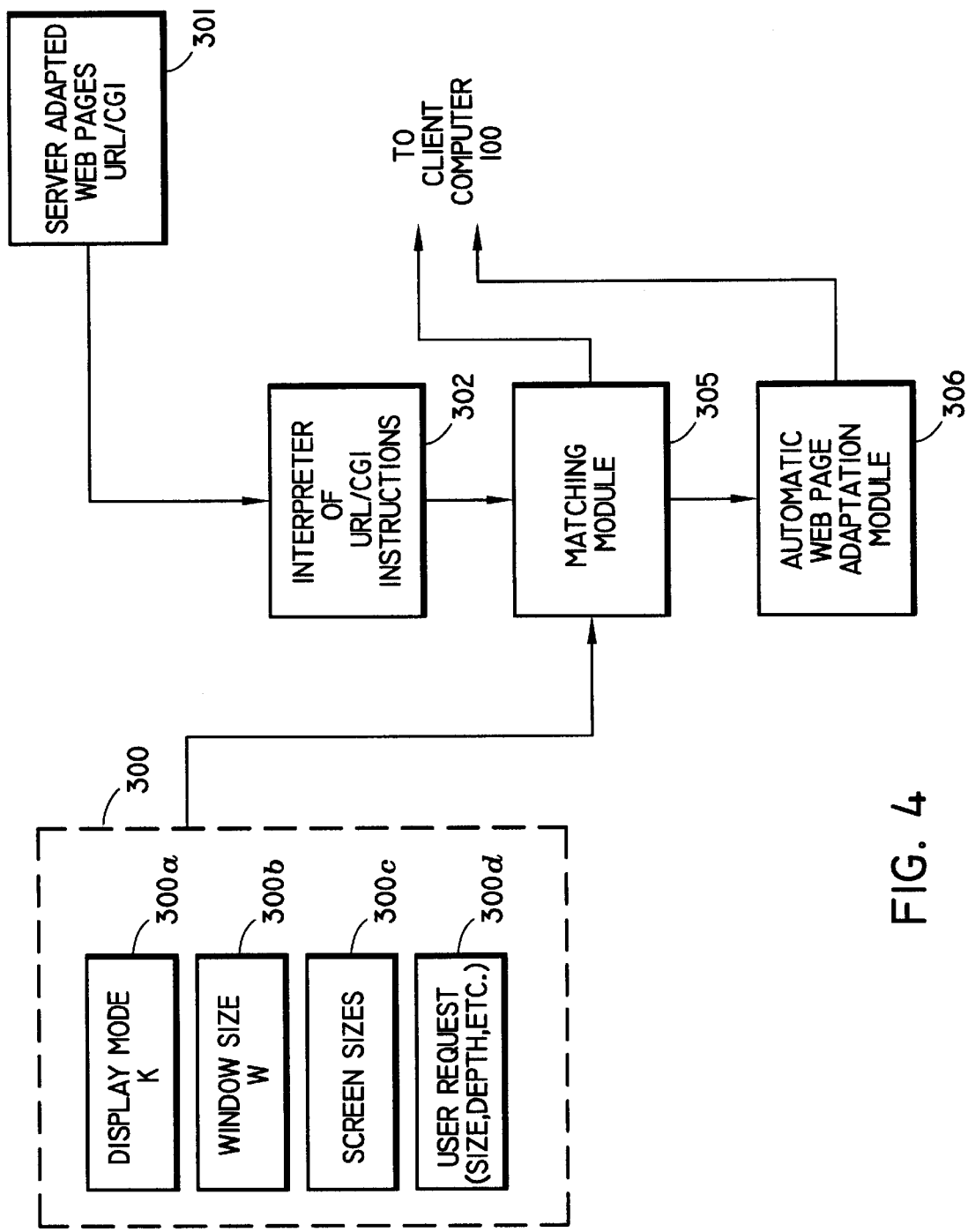
FIG. 4 is a diagram illustrating a client web page adaptor module according to the invention.

Referring now to FIG. 4, a client web page adaptor module 112 (FIG. 1) is shown. As previously mentioned, similar adaptation functions as discussed above, as well as others, may be performed by the adaptor module 112. The adaptor module 112 is preferably run (executed) on the client machine 100 and is similar in many respects to adaptor 107 (as shown in detail and described in the context of FIGS. 3, 8 and 9). Alternatively, the client adaptor module 112 may also be incorporated into the web browser software which the client machine employs to browse the World Wide Web.

Additional adaptation of web pages at the client machine 100 may be needed for several reasons. For example, a user may want to adapt a web page to a window (shell) rather than merely to a display screen. A display screen can contain several (overlapping) windows. A window typically has less area than a display screen and, as a result, other transformation is required for web pages for a given window. Sizes of windows can be changed by a user via zoom operations. In accordance with changed sizes of windows, different web page adaptation is applied. Similarly, a display system can consist of several screens (if several monitors are connected to the same machine) and, therefore, adaptation at the client machine is needed to specify adaptation at each screen.

The parameters associated with these varied display situations are provided to module 112 from the client machine 110 in a similar message format as display mode message 103 (FIG. 5). Such information may include a display mode number (300*a*), window size W (300*b*) and/or screen sizes (300*c*). Such arrangement also permits the user to send a request (300*d*) to the adaptor module 112 for the particular size he would like for a web page. For example, the window zoom command can also be applied to web pages and, as a result, the web pages would be adapted at the user request. The user also can control the adaptation depth (e.g., issuing a command, cookie, registry) for web pages and, as a result, the web pages are adapted in the client machine for the requested depth.

Performing certain adaptation functions at the client machine 100 using the adaptor module 112 can have certain advantages over performing such functions at the adaptor server 107.

For example, a client machine can store more detailed information about user priorities than may be available at a server machine. A client machine may have more powerful and efficient tools for semantic interpretations than a server machine. A client machine may estimate object sizes and re-adapt web pages. For example, a client machine running the adaptor module 112 can display a picture from a compressed file and estimate the picture's size relative to the screen. Such operation may be prohibitively costly for a server machine, since the server needs to process calls from many users and may be burdened if also required to perform display functions more local to the user's computer.

The display, screen, window and/or request information 300 is provided to the adaptor module 112, particularly, to a matching module 305, while the server adapted web pages URL/CGI data 301 is provided to an interpreter module 302. The interpreter module 302 performs the same functions as the interpreter module 202 (FIG. 3), i.e., reads the numeric data associated with the URL/CGI instructions. Likewise, the matching module performs the same functions as the matching module 203 (FIG. 3), i.e., comparing the numeric data provided by the interpreter module to the display related information to determine if the web page data will fit the user display screen. In this case, however, the determination is whether the web page data will fit a particular window shell displayed on the screen. If a substantial match exists, then the web page data is sent to the client computer for display (or merely forwarded to the portion of the computer which handles display operations if the adaptor module 112 is resident in the computer). If not, then the web page data is sent to an automatic web page adaptation module 306 which performs the same function as adaptation module 207 (FIG. 3), i.e., transform web page data to accommodate the user's display screen (particularly, in this case, to accomodate the window shell). It is to be appreciated that the server adapted web pages URL/CGI data 301 is the web page data received by the client machine 100, over connection 111, from the web page adaptor server 107 (via server 104). Since, the operations of the adaptor module 112 is substantially similar to the adaptor server 107, the identical operations will not be repeated. However, it is important to point out that the main difference between the adaptor module 112 and the adaptor server 107 is that the module 112 takes into account a window size W (300*b*). The window size (i.e., a size of a shell that is displayed on a screen) is a local variable parameter and is preferably addressed at the local web adaptor module 112. This is because the window size can be changed dynamically by the user, e.g., by dragging the margins of a window shell with the mouse to expand or contract the shell, as is known. Accordingly, since there is a prohibitively large number of shell sizes that can be chosen by the user, it is not practical to have a collection of different URL/CGI instructions that are prepared in advance, as is done in the adaptor server 107 (i.e., 201*a*–201*d* used by the search module 205), for displays of different sizes for different devices (e.g., PC, laptop, palmtop). In fact, that is why no module equivalent to the search module 205 is required in the adaptor module 112.

The local use of an adaptor module 112 in conjunction with the client computer 100 has other benefits. For example, a user can click his mouse on the right hand corner of a window shell A which, itself, contains a web page thereby converting the shell to an icon B. This process is well known in the art. Now, the URL information for shell A can be stored (e.g., RAM 14 or mass storage 18 in FIG. 2) on the computer 100. If the user then clicked on the icon B to display shell A, rather than the module 112 having to present the web page data to its adaptor module 306, the stored URL information is used to display the shell A and the web page data associated therewith. Now, if the user then changes the size of the shell to create a shell C, the module 112 adapts the web page data. Then, if the user again clicks on the corner of shell C to create an icon B, the newly adapted URL data associated with shell C is stored on the computer. Accordingly, processing time is saved by storing adapted web page data associated with user-defined shell sizes.

Referring now to FIG. 15, two examples of display screens having shapes different than the typical square or rectangular shape of computer monitors, are shown. It is to be appreciated that the screens in FIG. 15 are shown to illustrate the fact that the adaptation schemes of the present invention are not limited to merely transforming web pages to fit square or rectangular shaped screens but rather may be implemented in systems having screens of various shape. Screen 1701 illustrates an adapted web page displayed on a round display. The adaptation system of the invention transforms selected web page data to be displayed along circles of different radii. Text written on a circle with a smaller radius may represent a link which corresponds to a textual link written on a circle of larger radius. For example, an adapted Yahoo page is illustrated in 1701. A link "IRAQ CRISIS" represents one of many possible links that are associated with a link "TOP STORIES". Similarly, links "W.", "T.", and "S." may represent links to information regarding "World", "Technology", and "Sports", which are associated with the link "OTHERS". Further, the display could be rotated as a circular window shell so that a person could change the position (orientation) of the letters. Applications of such round displays may be on watch faces, vehicles, etc.

Screen 1702 illustrates an adapted web page displayed on a triangular display. Such shaped displays may find applications in, for example, video games. It is to be appreciated that the adaptation schemes of the invention can be utilized to transform windows into various shapes (e.g., round, triangular, etc.) For display on square or other shaped display monitors. The examples in FIG. 15 are merely illustrative and not intended to limit the scope of applications with which the present invention may be implemented.

It is to be appreciated that the teachings of the present invention may be implemented in accordance with embedded technology. Embedded technology refers to the use of an integrated circuit included (embedded) in a device for performing some specific applications. Typically, embedded technology finds application in devices of small sizes. For instance, a web data display driver chip may be embedded into a small device for providing that device with the capability to display web data. A wristwatch is one example of such a device. As such, automatic web page adaptation features of the present invention may be implemented in accordance with such a device. For instance, the watch may have a display device of the round shape illustrated in FIG. 15, i.e., screen 1701. Further, the web data adaptation features discussed herein may be implemented on an integrated circuit(s) embedded in the watch. Thus, a user of such a watch device enjoys the ability to receive and view web data in accordance with the advantages provided by the automatic adaptation features of the present invention.

Figure 16:
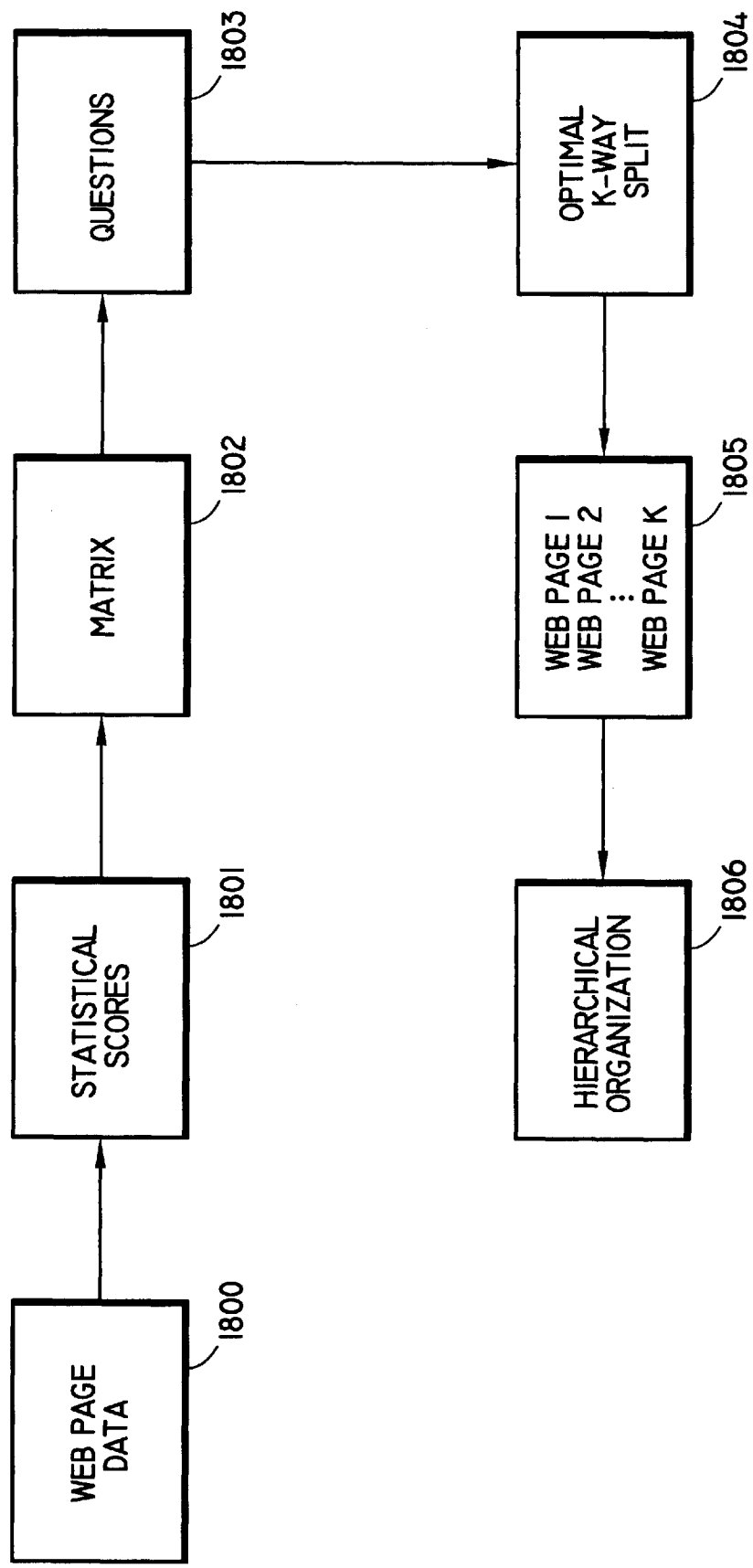
FIG. 16 is a flow chart illustrating a statistical approach to formatting web page data according to the invention.

Referring to FIG. 16, a flow chart of a statistical method for adapting web page data according to the present invention. It is to be appreciated that this method is performed by the semantic interpreter module 905 (FIG. 9) of the automatic web page adaptation module 207 (FIG. 3) and, if included in the system, the semantic interpreter module of the automatic web page adaptation module 306.

As discussed, in the introduction, two approaches for semantic interpretations are provided: (1) rule based (e.g. FSA) and (2) statistical (e.g. decision trees). Both of them can be done on the level of module 905. This is a known fact that counting events and separating events with different counts, one can classify events with common semantic context. For example, if number of visits of two different icons by users on the same page are correlated statistically—they may be related via some semantic concept. For example, let some web page for stock quotation represent several icons for some company stocks (e.g. Microsoft, IBM, Apple, Warner Brothers, Columbia, and Mercury). Assume also that counting visits of these icons show that visits of Microsoft, IBM, Apple icons are correlated. Also visits of Warner Brothers, Columbia, and Mercury also are correlated.

Using statistical technique for splitting set of icons that is described herein suggests to split these six icons in two groups—in the first group with a new icon would go three icons of companies Microsoft, IBM, Apple and in the second group with another new icon would go Warner Brothers, Columbia, and Mercury icons. A question that is relevant to this split could be: Are frequencies of visits of two icons I1 and I2 correlated? Or in mathematical form: is $P(I1, I2)/P(I1)P(I2) > h$? Where $P(I1)$ is a frequency of visits of I1 and $P(I1,I2)$ is a frequency of visits of both I1 and I2). One can see that these companies are related as either computer companies or as entertainment companies, i.e., in this example of statistically related split, a semantic concept is produced—to put in one group icons that relate to COMPUTER companies and put into another group icons that are related to ENTERTAINMENT companies.

New icons that are associated with COMPUTER groups and ENTERTAINMENT groups could contain special titles. One can use some methods to identify a name of semantic concept when some icons are grouped together. For example, one can use a dictionary or encyclopedia search to find out what words are associated with different icons. For example, some encyclopedia may contain explanations that Microsoft, IBM and APPLE are related to computers. Thus, COMPUTER word would be singled out and a concept COMPUTER would be associated with these icons.

After such classifications of icons is done one can make a small web page that contain only two icons COMPUTER and ENTERTAINMENT. The icon with COMPUTER title would be linked to another web page that contains names of computer companies (with stock related information). Similarly the icon with ENTERTAINMENT word would be linked to a new web page with stock quotations for entertainment companies. This way a large page with several icons would be packed into smaller set of web pages that are identified semantically using statistical approach.

Referring back to FIG. 16, web page data 1800 contains different objects, e.g., links, pictures, icons, texts. These objects are statistically scored in block 1801. There are many ways of attaching statistical scores to the objects, any of which would be sufficient. One example approach to attaching statistical scores is as follows. For each object on a page, a count is established relating to how many times that particular object was used by one or several users. This count is divided by a total count of how many times a given page is activated. This gives a probabilistic score attached to an object on a page. Assume that there are n different objects on a page. This gives rise to n scores that can be considered as an n-dimensional vector or as an n×1 matrix, i.e., one column with n elements (block 1802). Further, it is possible that each single object consists of m sub-objects. For example, each object may consist of a related icon and link that can be activated separately. In this case, two scores can be attached to each object and, therefore, n objects give rise to an n×2 dimensional matrix.

Now, assume that a page on screen is to be split into two smaller pages that fit small screens. Thus, n objects must be split into two groups. Criteria for performing the split can be related to a particular question asked (block 1803). That is, every split of objects into two groups can be interpreted as a question.

Conversely, any question defines some split of objects. Examples of questions of such questions to be asked could be: Is this object related to finance or health? Is this object visited by children? Is this a pictorial object? It is to be appreciated that there are various statistical criteria for choosing the "best" question, or, equivalently, best split. These statistical methods are described in reference: Leo Breiman, Jerome H. Freidman, Richard A. Olshen, Charles J. Stone, "Classification and Regression Trees", 1984, Wadsworth Inc. The following reference demonstrates how statistically generated questions and trees lead to discovering of semantic concepts in textual data: L. R. Bahl, P. F. Brown, P. V. deSouza and R. L. Mercer, A Tree-Based Statistical Language Model for Language Speech Recognition, IEEE Transactions on Acoustics, Speech, and Signal Processing, Vol. 37, No. 7, July 1989. These methods define the "best" question (split) in order to minimize an entropy-like function that is computed on scores of objects that are split into two groups. Thus, based on the question or questions asked, the page is split into two pages. If a screen is to be split into k screens or equivalently, if it is desired to place n objects into k subsets, this gives rise to a k-way split (block 1804). Each split of n objects into k subsets gives rise to k new smaller screens or web pages (block 1805). These screens or web pages can be organized hierarchically (block 1806) in such a way that a user first views a page 1 that is linked to other pages. Alternatively, the adaptation can be performed such that a user views a general "introductory" page that has links to all other k pages including a definition of each page. These definitions depend on the questions that were used to split the pages. For example, if the question, "Is this object related to finance?," was used, then a name for a link to a related page in the introductory page could be "Finance".

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of automatically adapting a viewable information signal received from a wide area network server for display on a display screen associated with a user computer system, the apparatus comprising:

transmitting a user request signal from the user computer system to the network server, the user request signal including information relating to at least one display screen-related attribute associated with the user's display screen and information specific to the user's request;

generating the viewable information signal in response to the information specific to the user's request; and adapting the viewable information signal in response to the at least one display screen-related attribute to semantically conform the information associated therewith to the user's display screen when viewed, wherein said adapting step comprises the steps of:

separating web page data for a given web page into a first and a second group, the first and the second group comprising data objects whose sizes can and cannot be estimated from a web script, respectively;

removing at least some of the data objects in the second group from the given web page;

generating hyperlinks to the at least some of the data objects in the second group; and adding the hyperlinks to the given web page.

2. The method according to claim 1, wherein said method is implemented by a program storage device readable by machine, tangibly embodying a program of instructions executable by the machine to perform said method steps.

3. A method of automatically adapting a viewable information signal received from a wide area network server for display on a display screen associated with a user computer system, the apparatus comprising:

transmitting a user request signal from the user computer system to the network server, the user request signal including information relating to at least one display screen-related attribute associated with the user's display screen and information specific to the user's request;

generating the viewable information signal in response to the information specific to the user's request; and adapting the viewable information signal in response to the at least one display screen-related attribute to semantically conform the information associated therewith to the user's display screen when viewed, wherein said adapting step comprises the steps of:

separating web page data for a given web page into a first group and a second group, the first group comprising data objects having a higher priority thank data objects in the second group;

removing at least some of the data objects in the second group from the given web page;

generating hyperlinks to the at least some of the data objects in the second group; and adding the hyperlinks to the given web page.

4. The method of claim 3, wherein said adapting step comprises the step of defining a priority of a data object based upon predefined criteria corresponding to at least one of an importance to a user, a frequency of selection, content dependencies, and hierarchical dependencies.

5. The method of claim 3, further comprising the step of defining a priority of a data object based upon predefined criteria corresponding to at least one of a page depth, a time depth, and a volume depth, the page depth corresponding to a number of web pages to be conformed to the user's display screen in a single user call, the time depth corresponding to a time period required to adapt at least one of a target web page and a target data object to conform to the user's display screen when viewed, the volume depth corresponding to an amount of data to be conformed to the user's display screen when viewed.

6. The method of claim 5, further comprising the step of imposing a semantic constraint on at least one of the time depth and the volume depth, so that only web pages conforming to the semantic constraint are made to conform to the user's display screen when viewed.

7. The method according to claim 3, wherein said method is implemented by a program storage device readable by machine, tangibly embodying a program of instructions executable by the machine to perform said method steps.

8. A method of automatically adapting a viewable information signal received from a wide area network server for display on a display screen associated with a user computer system, the apparatus comprising:

transmitting a user request signal from the user computer system to the network server, the user request signal including information relating to at least one display screen-related attribute associated with the user's display screen and information specific to the user's request;

generating the viewable information signal in response to the information specific to the user's request; and adapting the viewable information signal in response to the at least one display screen-related attribute to semantically conform the information associated therewith to the user's display screen when viewed, wherein said adapting step comprises the steps of:

dividing at least two icons into portions; and combining at least one portion of each of the at least two icons to form a composite icon, wherein information represented by one of the at least two icons is selected when the corresponding portion of the composite icon is selected.

9. The method according to claim 8, wherein said method is implemented by a program storage device readable by machine, tangibly embodying a program of instructions executable by the machine to perform said method steps.

10. A method of automatically adapting viewable information signal received from a wide area network server for display on a display screen associated with a user computer system, the apparatus comprising:

transmitting a user request signal from the user computer system to the network server, the user request signal including information relating to at least one display screen-related attribute associated with the user's display screen and information specific to the user's request;

generating the viewable information signal in response to the information specific to the user's request; and adapting the viewable information signal in response to the at least one display screen-related attribute to semantically conform the information associated therewith to the user's display screen when viewed, wherein said adapting step comprises the steps of:

dividing a web page into at least two pages; and hyperlinking the at least two pages together, so that the at least two pages can be viewed on the display screen one of concurrently but in a different configuration than the web page and sequentially.

11. The method of claim 10, wherein said dividing step further comprises the steps of:

assigning statistical scores to data objects in the at least two web pages;

generating a matrix comprising the statistical scores;

splitting the data objects into at least two groups, based on predefined criteria; and forming an individual web page for each of the at least two groups; and hyperlinking the individual web pages for the at least two groups.

12. The method of claim 11, wherein said hyperlinking step hyperlinks the individual web pages for the at least two groups hierarchically.

13. The method of claim 11, wherein the predefined criteria is in a form of a question.

14. The method according to claim 10, wherein said method is implemented by a program storage device readable by machine, tangibly embodying a program of instructions executable by the machine to perform said method steps.

15. A method of automatically adapting a viewable information signal received from a wide area network server for display on a display screen associated with a user computer system, the apparatus comprising:

transmitting a user request signal from the user computer system to the network server, the user request signal including information relating to at least one display screen-related attribute associated with the user's display screen and information specific to the user's request;

generating the viewable information signal in response to the information specific to the user's request; and adapting the viewable information signal in response to the at least one display screen-related attribute to semantically conform the information associated therewith to the user's display screen when viewed, wherein said adapting step comprises the step of combining objects in at least one web page that one of include and reference information corresponding to one of a same topic and a similar topic.

16. The method of claim 15, wherein the adapting step is rule-based.

17. The method of claim 15, wherein the adapting step is statistic-based.

18. The method of claim 15, wherein the at least one display screen-related attribute includes a screen size.

19. The method of claim 15, wherein the at least one display screen-related attribute includes a window size.

20. The method of claim 15, wherein the at least one display screen-related attribute comprises a shape of one of the display screen and a window displayed thereon.

21. The method of claim 20, wherein said adapting step comprises the step of fitting the information to the shape of one of the display screen and the window.

22. The method of claim 21, wherein said fitting step comprises the step of placing at least one of lines, data objects, and text in parallel with at least one edge of the shape of one of the display screen and the window.

23. The method of claim 15, wherein said adapting step comprises the step of removing at least one object from a web page to be displayed, when the display screen is smaller than a predefined threshold.

24. The method of claim 15, wherein said adapting step comprises the step of adding at least one object to a web page to be displayed, when the display screen is one of equal to and larger than a predefined threshold, the at least one object corresponding to at least one link comprised in the web page to be displayed.

25. The method of claim 15, wherein said adapting step comprises the step of creating one of an icon, a button, and a hyperlink to collectively represent the combined objects.

26. The method of claim 15, wherein said adapting step comprises the step of separating objects in at least one web page that one of include and reference information corresponding to different topics.

27. The method of claim 15, wherein said adapting step comprises at least one of the steps of:

abbreviating text in a web page;

replacing pictures by portions of the pictures; and replacing icons by textual names.

28. The method according to claim 15, wherein said method is implemented by a program storage device readable by machine, tangibly embodying a program of instructions executable by the machine to perform said method steps.

* * * * *